(12) United States Patent
Nanjo

(10) Patent No.: US 7,969,486 B2
(45) Date of Patent: Jun. 28, 2011

(54) IMAGE-CAPTURE APPARATUS AND VARIABLE MAGNIFICATION LENS

(75) Inventor: Yusuke Nanjo, Kanagawa (JP)

(73) Assignee: Sony Corporation, Tokyo (JP)

( * ) Notice: Subject to any disclaimer, the term of this patent is extended or adjusted under 35 U.S.C. 154(b) by 512 days.

(21) Appl. No.: 12/222,330

(22) Filed: Aug. 7, 2008

(65) Prior Publication Data

US 2009/0046199 A1 Feb. 19, 2009

(30) Foreign Application Priority Data

Aug. 9, 2007 (JP) .................................. 2007-208262

(51) Int. Cl.
*H04N 5/262* (2006.01)
(52) U.S. Cl. ...................... 348/240.3; 359/766; 359/745; 359/504
(58) Field of Classification Search ............... 348/240.3; 359/766, 745, 504
See application file for complete search history.

(56) References Cited

U.S. PATENT DOCUMENTS

| | | | |
|---|---|---|---|
| 7,292,398 B1 * | 11/2007 | Misaka et al. ................ | 359/781 |
| 7,446,804 B2 * | 11/2008 | Nanjo ......................... | 348/240.3 |
| 2006/0055815 A1 * | 3/2006 | Nanjo et al. .................. | 348/360 |
| 2007/0008418 A1 * | 1/2007 | Kuroda et al. ............. | 348/240.3 |

FOREIGN PATENT DOCUMENTS

| | | |
|---|---|---|
| JP | 04-061570 | 2/1992 |
| JP | 04-350815 | 12/1992 |
| JP | 2005-352348 | 12/2005 |

* cited by examiner

*Primary Examiner* — James M Hannett

(74) *Attorney, Agent, or Firm* — Rader, Fishman & Grauer PLLC

(57) ABSTRACT

An image-capture apparatus includes a variable magnification lens, imaging means for converting an image taken by the variable magnification lens into an electrical image signal, and imaging control means. By referring to a conversion coordinate coefficient, the image control means moves a point on the image and outputs the new image signal. In the variable magnification lens, in order from the object side, a first lens group having positive refractive power, a second lens group that has negative refractive power and performs a variable magnification action by shifting on an optical axis, a third lens group having positive refractive power, a fourth lens group that has negative refractive power and a fifth lens group having positive refractive power are arrayed.

9 Claims, 10 Drawing Sheets

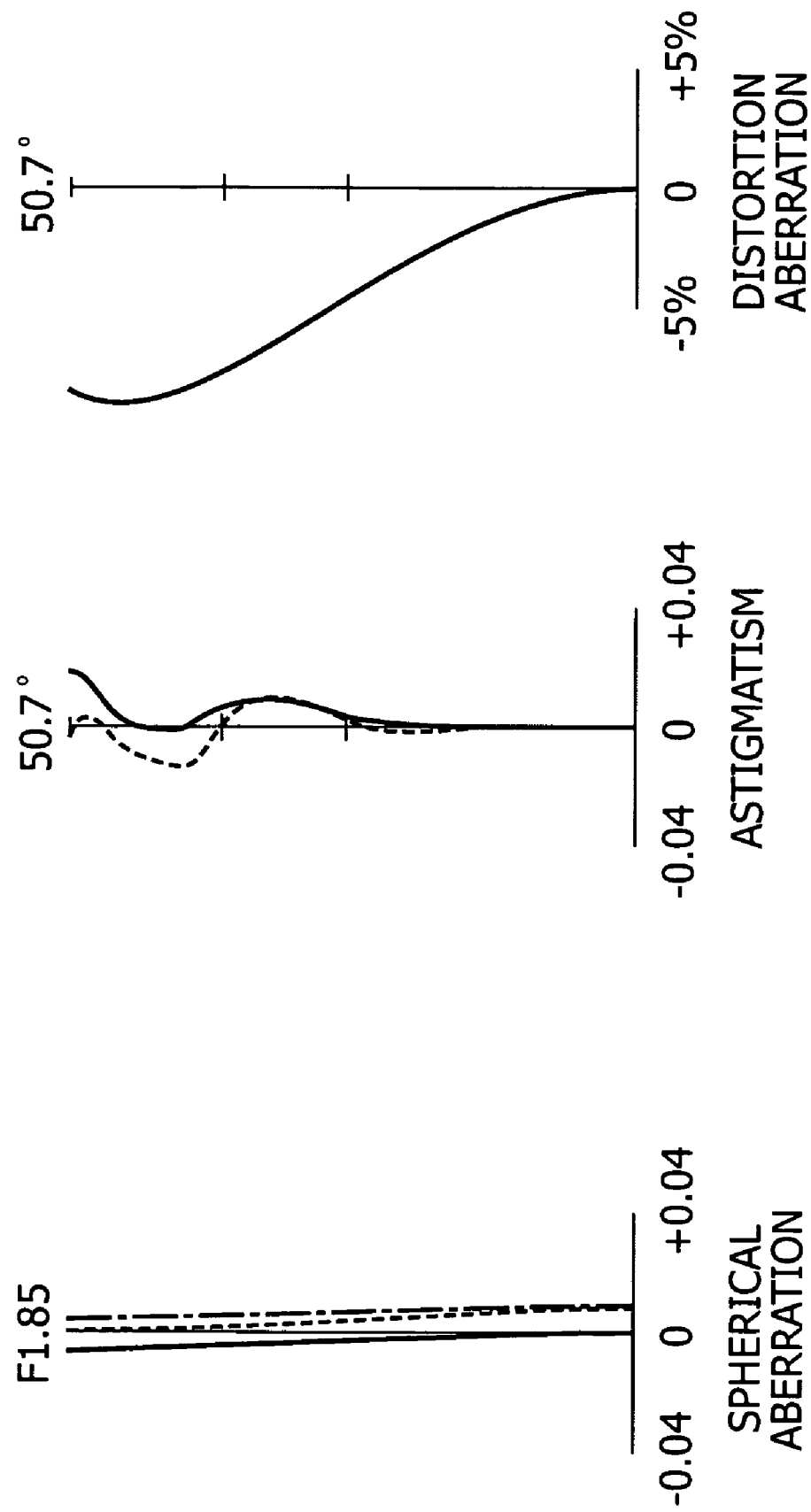

IMAGE-CAPTURE APPARATUS AND VARIABLE MAGNIFICATION LENS

BACKGROUND OF THE INVENTION

1. Field of the Invention

The present invention relates to an innovative image-capture apparatus and an innovative variable magnification lens, and particularly to a variable magnification lens preferable for a video camera use or a digital still camera use, and an image-capture apparatus using the lens. More specifically, the present invention relates to a variable magnification lens in which with a zoom lens as a base part, a lens group for increasing a focal distance at a telephoto end of the zoom lens is configured in an insertable and detachable manner to enlarge a variable magnification ratio, and a negative lens group is detachably configured in a front surface of the zoom lens to enlarge a variable magnification ratio toward the wide angle side, so that various types of aberration other than distortion aberration are favorably corrected, and an image-capture apparatus in which the variable magnification lens is used, a video signal obtained from an image-capture element is processed, so that the distortion aberration by the variable magnification lens is corrected to obtain an favorable image.

2. Description of Related Art

In Japanese Patent Application Publication No. 4-61570 (Patent Document 1), a video signal processing apparatus is proposed, in which distortion aberration caused by a lens is corrected by processing a video signal from a solid image-capture element.

Japanese Patent Application Publication No. 2005-352348 (Patent Document 2) shows that a configuration is preferable for achieving high magnification, in which in a 5-group zoom method constituted by an arrangement of positive, negative, positive, negative, and positive refractive powers in order from the object side, first, third and fifth lens groups are fixed, a second lens group is moved in an optical axis direction to vary power, and a fourth lens group performs correction of focal shift and focusing by zooming. There is provided an image-capture apparatus in which by the first lens group having a characterized lens configuration, a front lens diameter can be reduced in spite of a wide angle of view at the wide angle end, and distortion aberration, which would otherwise be difficult to correct, is corrected by the video signal processing according to Patent Document 1.

In Japanese Patent Application Publication No. 4-350815, (Patent Document 3), a constitution is shown, in which in a 4-group zoom method constituted such that positive, negative, positive, and positive refractive powers are arranged in order from the object side, first and third lens groups are fixed, a second lens group is mainly moved in an optical axis direction to vary magnification, and a fourth lens group performs a correction of focal point shift and focusing by zooming, an attachment lens of negative refractive power is detachably configured in front of a zoom lens.

Moreover, a constitution is known, in which an industrial zoom lens for a video camera is mainly formed of a focus lens part, a variable magnification lens part that varies magnification, and corrects focal shift due to the variable magnification, and a fixed master lens part that plays an image forming role. By inserting an extender lens group into a large air distance inside of the master lens part, a variable magnification focal distance area is shifted to the telephoto side.

SUMMARY OF THE INVENTION

According to Patent Document 2, if a focal distance is converted for a 35 mm based on a diagonal line angle of view after the distortion aberration is corrected by the video signal processing, a variable magnification ratio of about 40 times, which covers from substantially 25 mm to substantially 1000 mm, is achieved. However, in a lineup of zoom lenses for industrial portable HDTV (High Definition Television), a lens in which a wide angle end is substantially 17 mm, and a lens in which a the telephoto side exceeds 2000 mm when an extender is used.

It is expected that in Japan, full transition to terrestrial digital broadcasting will be made in a few year, that a large-sized color television with an aspect ratio of 16:9 will prevail, and accordingly, taste will be strongly required in a video camera for consumer use, thereby increasing demands for a super-high variable magnification ratio lens compatible with the HDTV.

However, when using the variable magnification means of Patent Document 2, the angle of view at the wide angle end is expanded, and further the focal distance at the telephoto end is extended to increase the variable magnification ratio, whereby an increase in size is caused, which makes the apparatus unsuitable for consumer applications. Moreover, a shift space of the fourth lens group is expanded, and a distance from an aperture to the fifth lens group becomes long, which makes an exit pupil distance short on the plus side, and an inclination of a light flux entering a screen peripheral part increases. This makes it hard for the light to effectively reach each pixel, and further, makes it difficult for the lens configuration of the first lens group to achieve a good balance between the refractive power arrangement suitable for the wide angle, and a suitable configuration as an objective lens of a telephoto lens. As a result, the effect of being small-sized in spite of a wide-angle high variable magnification ratio, especially the small front lens diameter, which characterizes Patent Document 2, is hardly to be exerted.

Moreover, in an embodiment described in Patent Document 2, barrel-shaped distortion aberration at the wide angle end is very large, but when the distortion aberration is corrected by the video signal processing, pixel spacing in the periphery of the screen is extended. This causes deterioration in image quality due to a phenomenon that an MTF (Modulation Transfer Function) of a certain spatial frequency shifts to a lower frequency side, and thus, the correction of the distortion aberration needs to be performed on the lens side to some extent even when the correcting means of Patent Document 1 is applied.

While the angle widening means according to Patent Document 3 is an effective method, as a portable method of the removed attachment lens, an ordinary portable method applied to attachment lens in which the attachment lens is fitted with lens caps in front and rear sides and housed in a case is employed. It is, however, inconvenient in usability, and the attachment take time, which makes it difficult to say it is practical.

Consequently, it is desirable to perform easy photographing at focal distances in a super wide angle area and a super telephoto area, and further enable photographing using continuously variable magnification in a focal range of a wide angle area to a telephoto area (focal distance having several tens times the of the wide angle area).

An image-capture apparatus according to embodiments of the present invention includes a variable magnification lens, image-capture means for converting an image taken by the variable magnification lens into an electrical image signal, and image control means. By referring to a conversion coordinate coefficient prepared in accordance with a variable magnification rate by the variable magnification lens in advance, the image control means moves a point on the image defined by the image signal formed by the image-capture means to form a new image signal subjected to the coordinate conversion, and outputs the new image signal. In the variable magnification lens, in order from the object side, a first lens group having positive refractive power, a second lens group that has negative refractive power and performs a variable magnification action by shifting on an optical axis, a third lens group having positive refractive power, a fourth lens group that has negative refractive power, and in varying magnification from a wide angle end to a telephoto end, shifts to the image side on the optical axis, and then shifts to the object side to correct fluctuation in image position caused by the variable magnification, and performs a focusing action, and a fifth lens group having positive refractive power are arrayed. T lens group made up of a positive lens group and a negative lens group located in order from the object side is arranged between the fourth lens group and the fifth lens group in an insertable and detachable manner. In a first variable magnification form, the first lens group, the third lens group and the fifth lens group are fixed, the T lens group is withdrawn from an optical path to a position where it does not disturb the shift of the fourth lens group, and mainly by shifting the second lens group in an optical axis direction, the magnification is varied. By shifting the fourth lens group in the optical axis direction, the correction of the fluctuation in image position and the focusing are performed, and in a second variable magnification form, the second lens group is fixed in a position of the telephoto end in the first variable magnification form, the T lens group is inserted between the fourth lens group and the fifth lens group so that an optical axis thereof is shared with the other lens groups to make a focal distance longer than a focal distance at the telephoto end in the first variable magnification form, and the focusing is performed by the fourth lens group.

Another image-capture apparatus of the present invention includes a variable magnification lens, imaging means for converting an image taken by the variable magnification lens into an electrical image signal, and image control means. By referring to a conversion coordinate coefficient prepared in accordance with a variable magnification rate by the variable magnification lens in advance, the image control means moves a point on the image defined by the image signal formed by the imaging means to form a new image signal subjected to the coordinate conversion, and outputs the new image signal. In the variable magnification lens, in order from the object side, a first lens group having positive refractive power, a second lens group that has negative refractive power and performs a variable magnification action by shifting on an optical axis, a third lens group having positive refractive power, a fourth lens group that has negative refractive power, and in varying magnification from a wide angle end to a telephoto end, shifts to the image side on the optical axis, and then shifts to the object side to correct fluctuation in image position caused by the variable magnification, and performs a focusing action, and a fifth lens group having positive refractive power are arrayed. W lens group made up of a negative lens group is detachably arranged on the object side of the first lens group. In a first variable magnification form, the W lens group is out of an optical path, the first lens group, the third lens group and the fifth lens group are fixed, and mainly by shifting the second lens group in an optical axis direction, the magnification is varied, and by shifting the fourth lens group in the optical axis direction, the correction of the fluctuation in image position and the focusing are performed. In a third variable magnification form, the second lens group is fixed in a position of the wide angle end in the first variable magnification form, the W lens group is attached so that an optical axis thereof is shared with the other lens groups to make a focal distance shorter than a focal distance at the wide angle end in the first variable magnification form, and the focusing is performed by the fourth lens group.

Still another image-capture apparatus of the present invention includes a variable magnification lens, imaging means for converting an image taken by the variable magnification lens into an electrical image signal, and image control means. By referring to a conversion coordinate coefficient prepared in accordance with a variable magnification rate by the variable magnification lens, the image control means moves a point on the image defined by the image signal formed by the imaging means to form a new image signal subjected to the coordinate conversion, and outputs the new image signal. In the variable magnification lens, in order from the object side, a first lens group having positive refractive power, a second lens group that has negative refractive power and performs a variable magnification action by shifting on an optical axis, a third lens group having positive refractive power, a fourth lens group that has negative refractive power, and in varying magnification from a wide angle end to a telephoto end, shifts to the image side on the optical axis, and then shifts to the object side to correct fluctuation in image position caused by the variable magnification, and performs a focusing action, and a fifth lens group having positive refractive power are arrayed. W lens group made up of a negative lens group is detachably arranged on the object side of the first lens group, and a T lens group made up of a positive lens group and a negative lens group in order from the object side is arranged between the fourth lens group and the fifth lens group in an insertable and detachable manner. In a first variable magnification form, the W lens group is out of an optical path, the first lens group, the third lens group and the fifth lens group are fixed, the T lens group is withdrawn from the optical path to a position where it does not disturb the shift of the fourth lens group, and mainly by shifting the second lens group in an optical axis direction, the magnification is varied. By shifting the fourth lens group in the optical axis direction, the correction of the fluctuation in image position and the focusing are performed, and in a second variable magnification form, with the W lens group detached from the optical path, the second lens group is fixed in a position of the telephoto end in the first variable magnification form, the T lens group is inserted between the fourth lens group and the fifth lens group so that an optical axis thereof is shared with the other lens groups to make a focal distance longer than a focal distance at the telephoto end in the first variable magnification form, and the focusing is performed by the fourth lens group. In a third variable magnification form, the second lens group is fixed in a position of the wide angle end in the first variable magnification form, the T lens group is withdrawn from the optical path, and the W lens group is attached so that an optical axis thereof is shared with the other lens groups to make a focal distance shorter than a focal distance at the wide angle end in the first variable magnification form, and the focusing is performed by the fourth lens group.

A variable magnification lens of the present invention includes, in order from the object side, a first lens group having positive refractive power, a second lens group that has negative refractive power and performs a variable magnification action by shifting on an optical axis, a third lens group having positive refractive power, a fourth lens group that has negative refractive power, and in varying magnification from a wide angle end to a telephoto end, shifts to the image side on the optical axis, and then shifts to the object side to correct fluctuation in image position caused by the variable magnification, and performs a focusing action, a fifth lens group having positive refractive power. T lens group arranged between the fourth lens group and the fifth lens group in an insertable and detachable manner is made up of a positive lens group and a negative lens group in order from the object side. In a first variable magnification form, the first lens group, the third lens group and the fifth lens group are fixed, the T lens group is withdrawn from an optical path to a position where it does not disturb the shift of the fourth lens group, and mainly by shifting the second lens group in an optical axis direction, the power is magnified, and by shifting the fourth lens group in the optical axis direction, the correction of the fluctuation in image position and the focusing are performed. In a second variable magnification form, the second lens group is fixed in a position of the telephoto end in the first variable magnification form, the T lens group is inserted between the fourth lens group and the fifth lens group so that an optical axis thereof is shared with the other lens groups to make a focal distance longer than a focal distance at the telephoto end in the first variable magnification form, and the focusing is performed by the fourth lens group.

In the present invention, photographing at focal distances in a super wide angle area and in a super telephoto area can be easily performed, and photographing using continuous variable magnification is enabled in a focal range from a wide angle area to a telephoto area (the focal distance which is several tens times of the wide angle area).

BRIEF DESCRIPTION OF THE DRAWINGS

FIG. 10 is a diagram showing spherical aberration, astigmatism, and distortion aberration in a super-wide-angle single focal mode (third variable magnification form), in which specific numerical values are applied to the variable magnification lens according to the one embodiment.

DETAILED DESCRIPTION OF THE EMBODIMENTS

Figure 1:
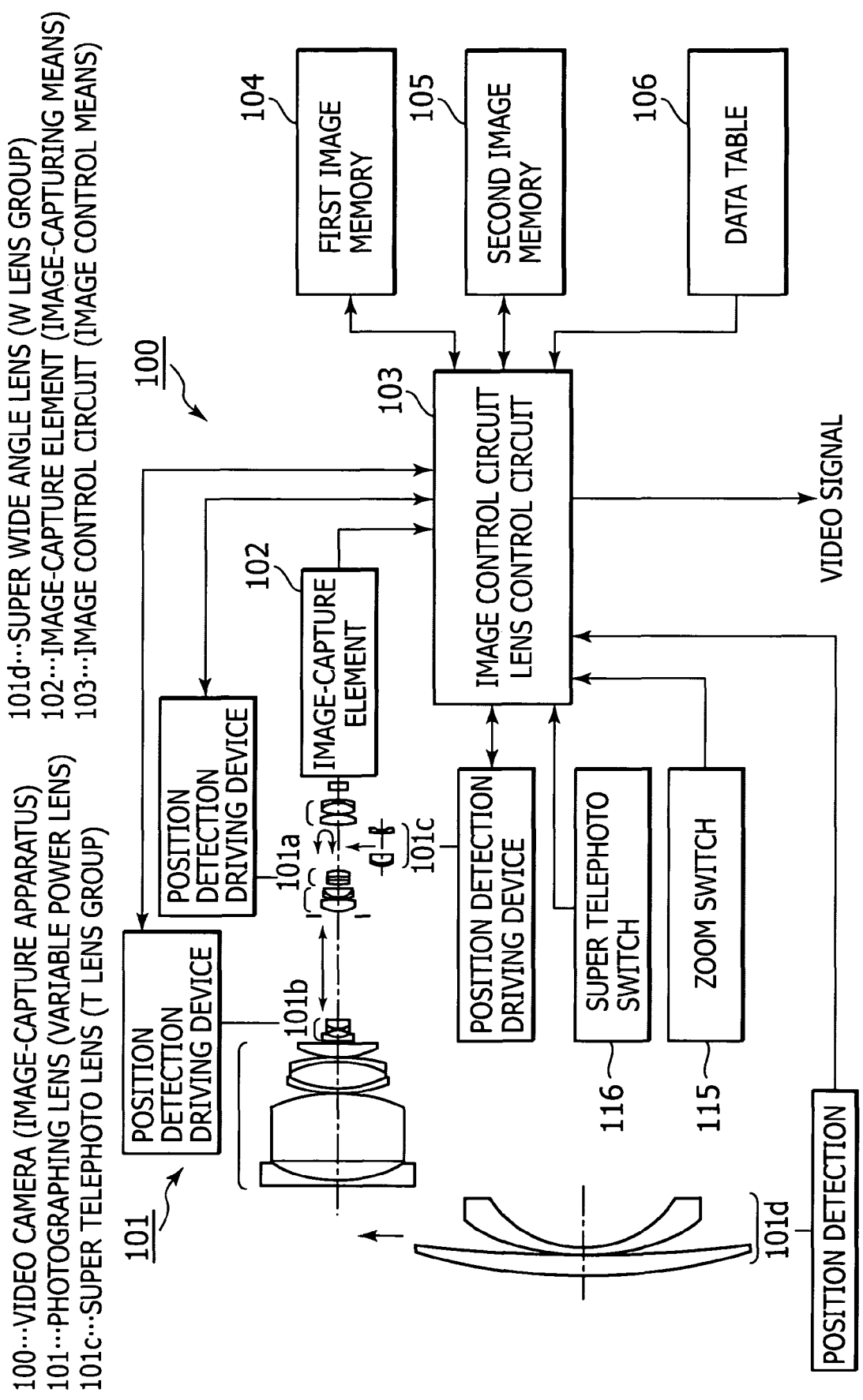
FIG. 1 is a block diagram showing one embodiment of an image-capture apparatus of the present invention.

Hereinafter, embodiments for carrying out an image-capture apparatus and a variable magnification lens according to the present invention are described.

First, the image-capture apparatus according to the present invention is described.

An image-capture apparatus according to a first embodiment of the present invention includes a variable magnification lens, imaging means for converting an image taken by the variable magnification lens into an electrical image signal, and image control means. While referring to a conversion coordinate coefficient prepared in accordance with a variable magnification rate by the variable magnification lens in advance, the image control means moves a point on the image defined by the image signal formed by the imaging means to form a new image signal subjected to the coordinate conversion, and outputs the new image signal. In the variable magnification lens, in order from the object side, a first lens group having positive refractive power, a second lens group that has negative refractive power and performs a variable magnification action by shifting on an optical axis, a third lens group having positive refractive power, a fourth lens group that has negative refractive power, and in varying magnification from a wide angle end to a telephoto end, shifts to the image side on the optical axis, and then shifts to the object side to correct fluctuation in image position caused by the variable magnification, and performs a focusing action, and a fifth lens group having positive refractive power are arrayed. T lens group made up of a positive lens group and a negative lens group located in order from the object side is arranged between the fourth lens group and the fifth lens group in an insertable and detachable manner. In a first variable magnification form, the first lens group, the third lens group and the fifth lens group are fixed, the T lens group is withdrawn from an optical path to a position where it does not disturb the shift of the fourth lens group, and mainly by shifting the second lens group in an optical axis direction, the magnification is varied, and by shifting the fourth lens group in the optical axis direction, the correction of the fluctuation in image position and the focusing are performed. In a second variable magnification form, the second lens group is fixed in a position of the telephoto end in the first variable magnification form, the T lens group is inserted between the fourth lens group and the fifth lens group so that an optical axis thereof is shared with the other lens groups to make a focal distance longer than a focal distance at the telephoto end in the first variable magnification form, and the focusing is performed by the fourth lens group.

In the image-capture apparatus according to the first embodiment, in the first variable magnification form in which the T lens group is withdrawn from the optical path, the photographing using continuous variable magnification is possible in a focal range from a wide angle area to a telephoto area (the focal distance which is several tens times of the wide angle area). Moreover, in the second variable magnification form, in which the T lens group is inserted into the optical path, the photographing in the super telephoto area in which the focal distance of the telephoto end in the first variable magnification is made longer, is enabled. In the photographing from the wide angle area to the super telephoto area, a high-quality image with distortion aberration corrected by the image control means can be obtained.

An image-capture apparatus according to a second embodiment of the present invention includes a variable magnification lens, imaging means for converting an image taken by the variable magnification lens into an electrical image signal, and image control means. While referring to a conversion coordinate coefficient prepared in accordance with a variable magnification rate by the variable magnification lens in advance, the image control means moves a point on the image defined by the image signal formed by the imaging means to form a new image signal subjected to the coordinate conversion, and outputs the new image signal. In the variable magnification lens, in order from the object side, a first lens group having positive refractive power, a second lens group that has negative refractive power and performs a variable magnification action by shifting on an optical axis, a third lens group having positive refractive power, a fourth lens group that has negative refractive power, and in varying magnification from a wide angle end to a telephoto end, shifts to the image side on the optical axis, and then shifts to the object side to correct fluctuation in image position caused by the variable magnification, and performs a focusing action, and a fifth lens group having positive refractive power are arrayed. W lens group made up of a negative lens group is detachably arranged on the object side of the first lens group. In a first variable magnification form, the W lens group is withdrawn from an optical path, the first lens group, the third lens group and the fifth lens group are fixed, and mainly by shifting the second lens group in an optical axis direction, the magnification is varied, and by shifting the fourth lens group in the optical axis direction, the correction of the fluctuation in image position and the focusing are performed. In a third variable magnification form, the second lens group is fixed in a position of the wide angle end in the first variable magnification form, the W lens group is attached so that an optical axis thereof is shared with the other lens groups to make a focal distance shorter than a focal distance at the wide angle end in the first variable magnification form, and the focusing is performed by the fourth lens group.

In this image-capture apparatus according to the second embodiment, in the first variable magnification form in which the W lens group is detached from the optical path, the photographing using continuous variable magnification is possible in the focal range from the wide angle area to the telephoto area (the focal distance which is several tens times of the wide angle area). Moreover, in the third variable magnification form, in which the W lens group is attached onto the optical path, the photographing in the super wide angle area in which the focal distance at the wide angle end in the first variable magnification form is made shorter, becomes possible. In the photographing from the super angle area to the telephoto area, a high-quality image with distortion aberration corrected by the image control means can be obtained.

An image-capture apparatus according to a third embodiment of the present invention includes a variable magnification lens, imaging means for converting an image taken by the variable magnification lens into an electrical image signal, and image control means. While referring to a conversion coordinate coefficient prepared in accordance with a variable magnification rate by the variable magnification lens in advance, the image control means moves a point on the image defined by the image signal formed by the imaging means to form a new image signal subjected to the coordinate conversion, and outputs the new image signal. In the variable magnification lens, in order from the object side, a first lens group having positive refractive power, a second lens group that has negative refractive power and performs a variable magnification action by shifting on an optical axis, a third lens group having positive refractive power, a fourth lens group that has negative refractive power, and in varying magnification from a wide angle end to a telephoto end, shifts to the image side on the optical axis once, and then shifts to the object side to correct fluctuation in image position caused with the variable magnification, and performs a focusing action, and a fifth lens group having positive refractive power are arrayed. W lens group made up of a negative lens group is detachably arranged on the object side of the first lens group, and a T lens group made up of a positive lens group and a negative lens group in order from the object side is arranged between the fourth lens group and the fifth lens group in an insertable and detachable manner. In a first variable magnification form, the W lens group is withdrawn from an optical path, the first lens group, the third lens group and the fifth lens group are fixed, the T lens group is withdrawn from the optical path to a position where it does not disturb the shift of the fourth lens group, and mainly by shifting the second lens group in an optical axis direction, the magnification is varied, and by shifting the fourth lens group in the optical axis direction, the correction of the fluctuation in image position and the focusing are performed. In a second variable magnification form, with the W lens group detached from the optical path, the second lens group is fixed in a position of the telephoto end in the first variable magnification form, the T lens group is inserted between the fourth lens group and the fifth lens group so that an optical axis thereof is shared with the other lens groups to make a focal distance longer than a focal distance at the telephoto end in the first variable magnification form, and the focusing is performed by the fourth lens group. In a third variable magnification form, the second lens group is fixed in a position of the wide angle end in the first variable magnification form, the T lens group is withdrawn from the optical path, and the W lens group is attached so that an optical axis thereof is shared with the other lens groups to make a focal distance shorter than a focal distance at the wide angle end in the first variable magnification form, and the focusing is performed by the fourth lens group.

In this image-capture apparatus according to the third embodiment, in the first variable magnification form in which the T lens group is withdrawn from the optical path and the W lens group is detached from the optical path, the photographing using continuous variable magnification is possible in the focal range from the wide angle area to the telephoto area (the focal distance which is several tens times of the wide angle area). Moreover, in the second variable magnification form in which the W lens group is detached from the optical path, and the T lens group is inserted into the optical path, the photographing in the super telephoto area in which the focal distance of the telephoto end in the first variable magnification form is enabled. Furthermore, in the third variable magnification form in which the T lens group is withdrawn from the optical path, and the W lens group is attached onto the optical path, the photographing in the super wide angle area in which the focal distance of the wide angle end in the first variable magnification is made shorter, is enabled. In the photographing from the super wide angle area to the super telephoto area, a high-quality image with distortion aberration corrected by the image control means can be obtained.

In the image-capture apparatuses according to the first to third embodiments of the present invention, in the first variable magnification form, for example, as in Patent Document 2, the effect of continuous variable magnification of about 40 times can be obtained. Further, the effect of acquiring a high-quality image with reduced distortion aberration by correcting distortion aberration in accordance with the respective focal distances by the image control means is attained.

In the image-capture apparatuses according to the first and third embodiments of the present invention, in the second variable magnification form, a super telephoto lens in which the focal distance at the telephoto end of the zoom lens of about 40 times is, for example, doubled can be realized without increasing the entire length at all, and the effect of acquiring a high-quality image with reduced distortion aberration may be attained.

In the image-capture apparatus according to the second and third embodiments of the present invention, in the third variable magnification form, the focal distance at the wide angle end of the zoom lens of about 40 times is made, for example, 0.7 times to realize a diagonal line angle exceeding 100 degrees, and the effect of acquiring a high-quality image with reduced distortion aberration may be attained.

In the image-capture apparatus according to one embodiment of the present invention, it is preferable that at power-up, whether the W lens group and the T lens group are on the optical path is detected, and based on a result of the detection, if the W lens group is on the optical path, the third variable magnification form is applied to withdraw the T lens group from the optical path, and if the W lens group is not on the optical path, but the T lens group is inserted on the optical path, the second variable magnification form is applied, and if neither of the W lens group nor the T lens group is on the optical path, the first variable magnification form is applied.

The priority of the three variable magnification forms is determined as follows: for example, the third variable magnification form in which the attachment and detachment of the W lens group is performed manually is given first priority, the second variable magnification form in which the insertion and withdrawal of the T lens group with respect to the optical axis is controlled by a driving device is given second priority, and in other cases, priority and the mode transition may be defined such that the first variable magnification form may be selected to improve usability for a user.

The image-capture apparatus according to one embodiment of the present invention, it is preferable that in super telephoto photographing in the second variable magnification form, an open aperture is kept without shielding a light flux directed to a screen center by an aperture blade.

There is a side effect that with a phenomenon of a darkened F-number incidentally occurring when the focal distance at the telephoto end in the first variable magnification form is extended in the second variable magnification form, a deterioration in resolution due to a diffraction phenomenon becomes prominent in the open aperture. Consequently, as in the present embodiment, prohibiting the control over image surface illuminance by the aperture blade can prevent this diffraction phenomenon from further deteriorating. In this case, in place of the brightness control of the screen by the aperture blade, the control over brightness can be performed, for example, by electronic shutter speed and AGC (Automatic Gain Control), or the image surface illuminance can also be controlled, for example, by inserting a variable-density ND (Neutral Density) filter integrally with the T lens group.

One example 100 of the image-capture apparatus obtained by embodying the image-capture apparatus of the present invention is shown in FIGS. 1 to 4. The present invention is applied to the image-capture apparatus 100 as a video camera.

Figure 2:
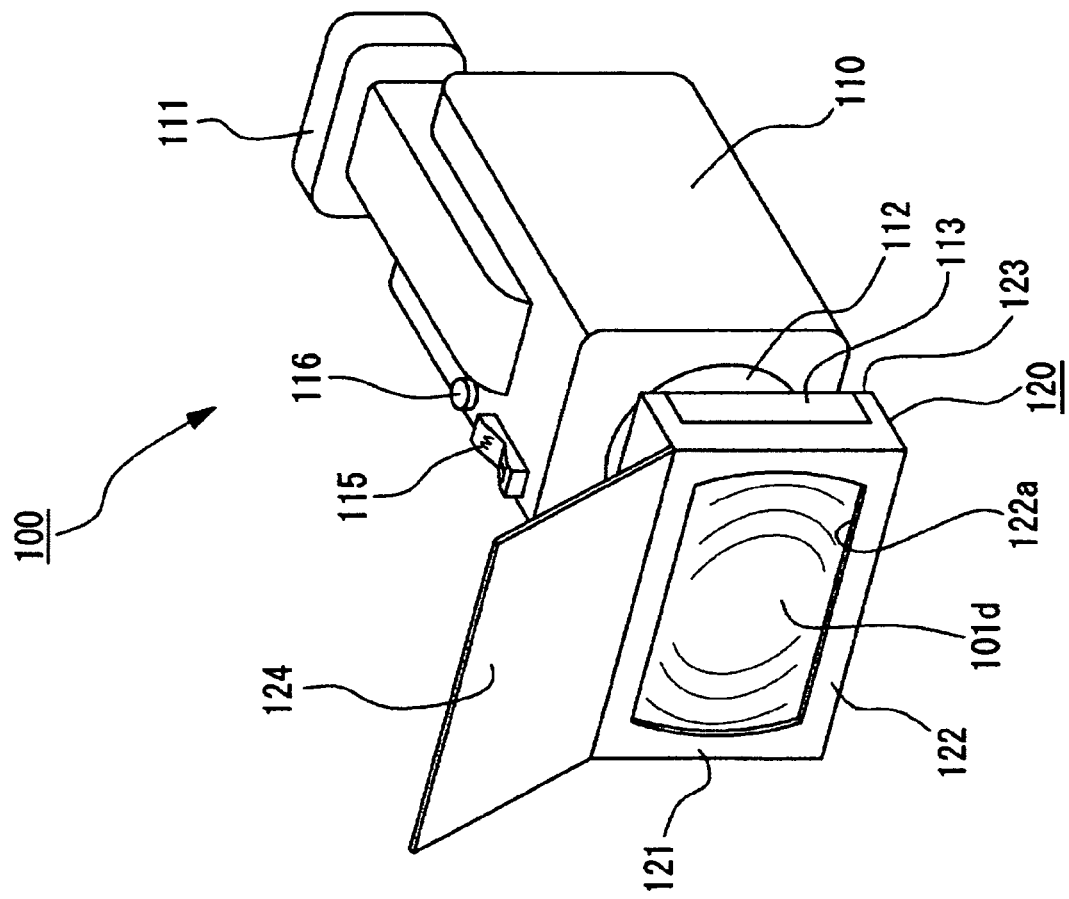
FIG. 2 is a schematic perspective view showing an outer appearance of the one embodiment of the image-capture apparatus of the present invention together with FIG. 3. The view shows a state in a super-wide-angle single focal mode (third variable magnification form)
Figure 3:
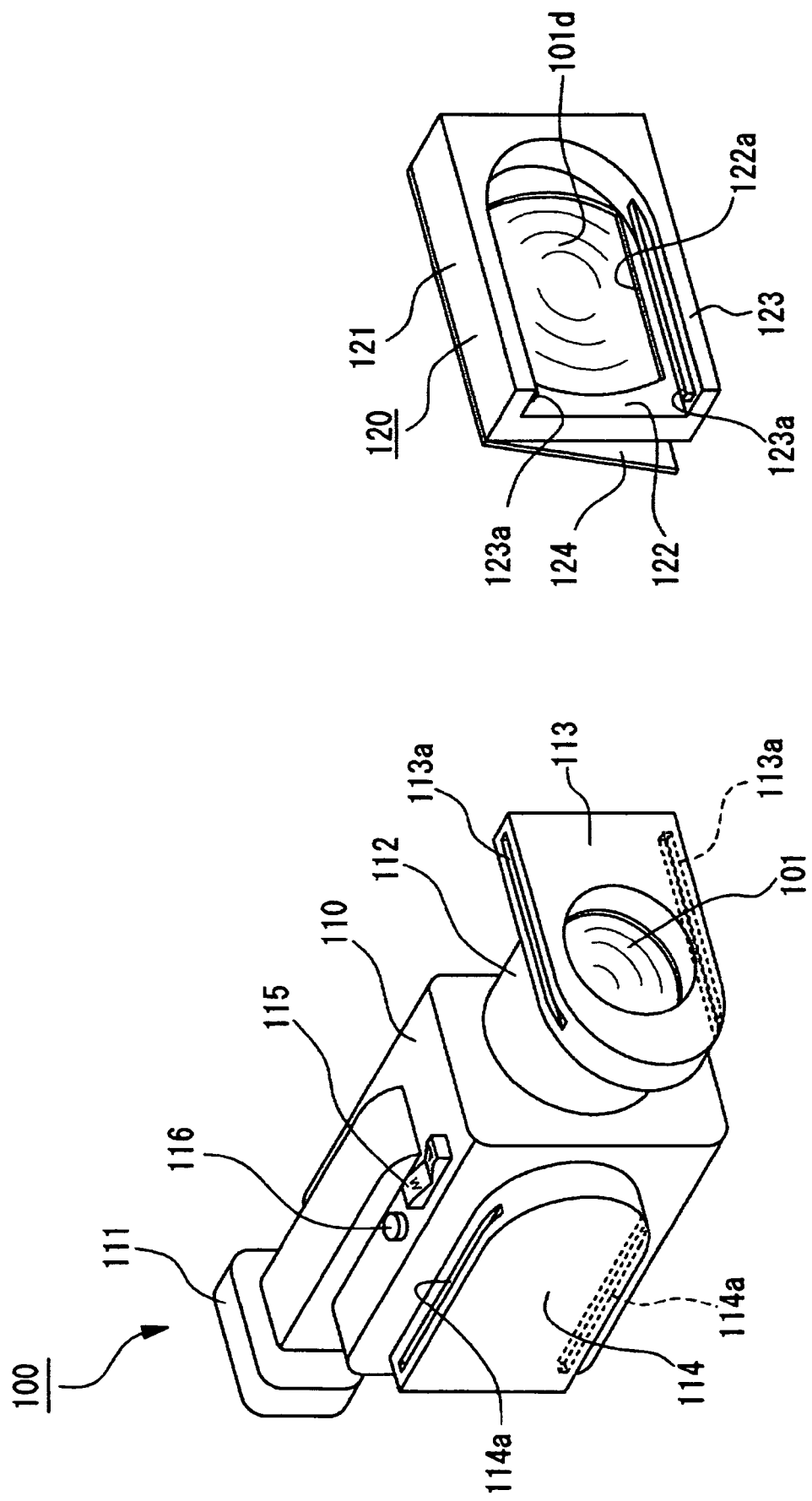
FIG. 3 is a schematic perspective view showing the image-capture apparatus by separating a super wide angle lens (w lens group) and a camera case.

As can be well seen in FIGS. 2 and 3, the video camera 100 includes a camera case 110, in which most parts of variable magnification lens 101, a controller including a control circuit, and a recording unit for recording an image signal on a recording medium, and the like are contained. Moreover, a finder 111 according to an EVF (Electronic View Finder) method, for example, is arranged in the back of a camera case 110. A portion of a lens barrel 112 supporting most parts of the variable magnification lens 101 is projected forward from a front end of the camera case 110, and in a front end portion thereof, an attachment supporting part 113 is formed. The attachment supporting part 113 has a plate shape having an anteroposterior thickness, and in both up and down portions, engaging grooves 113a, 113a are formed. Furthermore, a holding projection 114 is formed in one side surface of the camera case 110, and engaging grooves 114a, 114a are formed in both up and down side surfaces of the holding projection 114. In an upper surface of the camera case 110, a zoom button (zoom switch) 115, and a second mode button (super telephoto switch) 116 are provided.

In this video camera 100, a front attachment lens 120 is detachably provided in the front end of the lens barrel 112. In the front attachment lens 120, a W lens group (super wide angle lens) 101d is supported by a case 121. The case 121 is formed by integration of a lens holding frame part 122 and an attaching and detaching part 123 formed integrally on the back side of the lens holding part 122. The attaching and detaching part 123 has a U shape opened on one side, and engaging protrusions 123a, 123a are provided in vertically opposing portions across the U shape. A substantially elliptical, large opening 122a is formed in the lens holding part 122, and the W lens group 101d is held by the opening part 122a. A cover board 124 is rotatably provided in a front surface of the case 121. The cover board 124 is shaped such that it covers the whole of the front surface of the case 121, and an upper edge is rotatably supported by an upper edge of the front surface of the case 121. The cover board 124 is supported by the case 121, for example, through a frictional structure such that the board stops at a desired rotation angle, and is locked by locking means (not shown) at a position where the front surface of the case 121, accordingly, a front surface of the W lens group 101d is covered.

In the video camera 100, when the W lens group 101d is not used, that is, when photographing is performed in a first variable magnification form, or in a second variable magnification form, the front attachment lens 120 is detached from the front end part of the lens barrel 112. In this case, the front attachment lens 120 is held on the side surface of the camera case 110 because the front attachment lens 120 carried by hand, or put in a bag disturbs the photographing, and it is inconvenient to use the front attachment lens 120 next time. More specifically, the engaging protrusions 123a, 123a of the front attachment lens 120 are slid from the front side into the engaging grooves 114a, 114a of the holding projection 114 formed in the side surface of the camera case 110 for engagement, and the front attachment lens 120 is held in the camera case 110. At this time, it is preferable that by using a click stop or locking means, the front attachment lens 120 may be prevented from easily dropping off from the holding projection 114.

With the second mode button 116, for example, if this second mode button 116 is pressed in a state where a T lens group (super telephoto lens) 101c is not inserted into an optical path, a telephoto end state in the first variable magnification form is obtained, and at the same time, the T lens group 101c is inserted into the optical path. Further, if the second mode button 116 is pressed in a state where the T lens group 101c is inserted into the optical path, the T lens group 101c is withdrawn from the optical path.

Moreover, if the zoom button 115 is operated in the first variable magnification form, the focal distance is changed continuously between the wide angle end and the telephoto end.

When the photographing is performed in a third variable magnification form, the front attachment lens 120 is attached to the front end part of the lens barrel 112. The attachment is performed by sliding the engaging protrusion 123a, 123a of the front attachment lens 120 from the side so that the protrusions engage with the engaging grooves 113a, 113a formed in the attachment supporting part 113 of the front end part of the lens barrel 112. In a state where the front attachment lens 120 is attached to the front end part of the lens barrel 112, the front attachment lens 120 may be preferably locked. Moreover, in order to perform the photographing in the third variable magnification form, it is necessary that the wide angle end state in the first variable magnification form is obtained, and the W lens group 101c is withdrawn from the optical path. Although this can be manually operated by zoom button 115 and/or the second mode button 116, it is preferable if the controller may detect the attachment of the front attachment lens 120 to the front end part of the lens barrel 112 to automatically bring the above-described state. As such detecting means, a micro switch, a photo-interrupter, communication technology, such as an IC card, and the like are conceivable. Moreover, the cover board 124, for example, is moved to a position where the front surface of the W lens group 101d is not covered as shown in FIG. 2. This allows the cover board 124 to function as a lens hood, and thus the rotation angle of the cover board 124 is click-stopped at a desired angle. When the photographing is not performed, and when the front attachment lens 120 is detached from the front end part of the lens barrel 112, the cover board 124 may be locked in the position where the front surface of the W lens group 101d is covered, which allows the cover board 124 to function as a front lens cap. Moreover, in a state where the front attachment lens 120 is supported by the holding projection 114 of the camera case 110, the holding projection 114 covers a back side of the W lens group 101d and functions as a back-side lens cap.

Next, referring to a block diagram of FIG. 1, a detailed description of the video camera 100 is made.

The video camera 100 includes the photographing lens (variable magnification lens) 101 capable of varying magnification, and the photographing lens 101 includes a focus lens 101a, a variator lens 101b, the super telephoto lens (T lens group) 101c, and the super wide angle lens (W lens group) 101d and the like. Moreover, the video camera 100 includes an image-capture element 102, such as a CCD (Charge-Coupled Device), a CMOS (Complementary Metal-Oxide-Semiconductor) that outputs image data obtained by converting an optical image formed by the photographing lens 101 into an electrical image signal, an image control circuit 103 as image control means that controls various operations such as correction of distortion of the image data, a first image memory 104 that stores the image data obtained from the image-capture element 102, a second image memory 105 that stores image data with the distortion thereof corrected, and a data table 106 that stores distortion aberration information of the photographing lens 101. Furthermore, it includes the zoom switch (zoom button) 115 that converts an instruction of zooming by a photographer into an electrical signal, the super telephoto switch (second mode button) 116 that gives an instruction of insertion or detachment of the super telephoto lens 101c.

When, for example, the variable magnification lens according to the respective embodiments described later is applied to the photographing lens (variable magnification lens) 101, the focus lens 101a corresponds to a fourth lens group G4, the variator lens 101b corresponds to a second lens group G2, the super telephoto lens 101c corresponds to the T lens group T, and the super wide angle lens 101d corresponds to the W lens group W.

In the variable magnification lens 101, a distortion aberration curve changes depending on the variable magnification. The change in distortion aberration depends on a position of the variator lens 101b, the insertion and detachment of the super telephoto lens 101c, or the attachment and detachment of the super wide angle lens 101d. Consequently, in the data table 106, a conversion coordinate coefficient associating two-dimensional position information between the image data stored in the first image memory 104, and the image data with the distortion correction, which is stored in the second image memory 105, at a set focal distance. Moreover, for the position of the variator lens 101b, many positions from wide angle end to the telephoto end are separated, and a conversion coordinate coefficient corresponding to each of the positions is stored in the data table 106.

When the photographer operates the zoom switch 115 to move the position of the variator lens 101b, operates the super telephoto switch 116 to insert or detach the super telephoto lens 101c to the optical path, or attaches or detaches the super wide angle lens 101d manually, the image control circuit 103 moves the focus lens 101a and controls by avoiding defocus, and receives the conversion coordinate coefficient corresponding to the set focal distance from the data table 106. If the position of the variator lens 101b does not match with any one of the positions separated in advance, an appropriate conversion coordinate coefficient is obtained by processing such as interpolation from the peripheral conversion coordinate coefficients. The conversion coordinate coefficient is a coefficient for moving the position of a point on an image arranged two-dimensionally and discretely. With respect to an image between points arranged discretely, a moving position is obtained by the processing, such as interpolation. The image control circuit 103 corrects the distortion of the image data, which is obtained from the imaging element 102 and stored in the first image memory 104, by performing image moving processing in a vertical direction and a horizontal direction based on this conversion coordinate coefficient, causes the image data with the distortion corrected to be stored in the second image memory 105, and outputs a signal based on the image data stored in the second image memory 105 as a video signal.

For each of the focus lens 101a, the variator lens 101b, and the super telephoto lens 101c, a position detecting device and a driving device are constructed controllably in a relation of one to one, and with respect to the super wide angle lens 101d, the manual attachment and detachment may be detected by a position detecting device.

Figure 4:
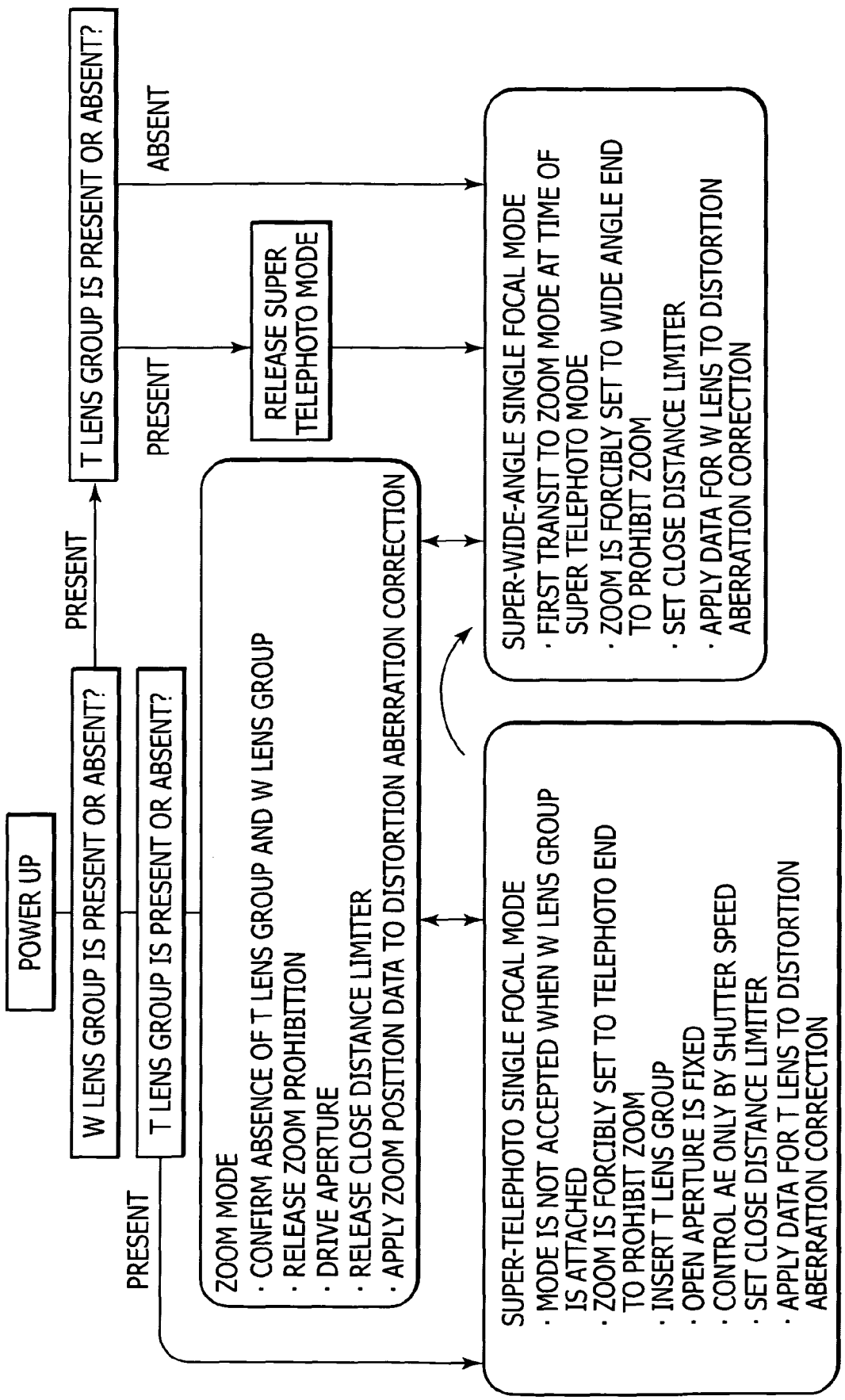
FIG. 4 is a flowchart showing an order from power-up to the selection of any of three variable magnification forms.

The video camera 100 has three modes of a super-wide-angle single focal mode (third variable magnification form), a zoom mode (first variable magnification form), and a super-telephoto single focal mode (second variable magnification form). Referring to FIG. 4, mode transition by a user operating to switch the mode is described.

A procedure starting with power-up of the image-capture apparatus is described. The super-wide-angle single focal mode in which the attachment and detachment of the super wide angle lens 101d is performed manually is given first priority. First, the attachment or detachment of the super wide angle lens 101d is checked, and if attachment is found, the setting of the super-wide-angle single focal mode is immediately performed. If the apparatus was in the super-telephoto single focal mode when the power was turned off last time, and the super wide angle lens 101d are attached manually before the power is turned on this time, it becomes a state where the super wide angle lens 101d is attached while the super telephoto lens 101c inserted. In this case, the super telephoto lens 101c is first withdrawn from the optical path by the driving device, and subsequently the variator lens 101b is moved to the position of the wide angle end to make setting not to receive an instruction of the zoom switch 115. Control is performed to shift the focus lens 101a to prevent defocus. However, if the same shift amount as that during the zoom mode is permitted, AF (Auto Focus) may be worked on dust or water droplet attached to surfaces of the super wide angle lens 101d, and thus, a close distance limiter by which the above-described inconvenience may not be caused, is set. With respect to photographed image data, a conversion coordinate coefficient corresponding to the case where the super wide angle lens 101d is attached is received from the data table 106, and the video signal processing for distortion aberration correction is performed.

Next, a case where the super wide angle lens 101d is not attached at power-up, but the super telephoto lens 101c is inserted is described. If the super telephoto switch 116 is not operated, the super-telephoto single focal mode is given priority, and the setting is made to shift the variator lens 101b to the telephoto end position so as not to receive an instruction of the zoom switch 115. In the super-telephoto single focal mode, since an open F-number becomes dark (F8 in a numerical example described later), and a small screen size is employed for downsizing the lens, therefore a problem with deterioration in image quality due to diffraction phenomenon is more serious than remaining aberration. Therefore, in order not to shield a center opening optical flux by an aperture blade, the drive of the aperture blade is limited, and for the control of brightness, means other than the aperture, such as an electronic shutter speed is used.

Moreover, the super telephoto lens 101c is inserted into a shift space of the focus lens 101a, and thus, if the focus lens 101a is largely shifted for focusing, it abuts against the super telephoto lens 101c. Therefore, from a different reason from that in the super-wide-angle focal mode, the close distance limiter needs to be set. For the photographed image data, the conversion coordinate coefficient corresponding to the case where the super wide angle lens 101d is inserted is received from the data table 106 to perform the video signal processing for distortion aberration correction.

If the super wide angle lens 101d is not attached at power-up, and the super telephoto lens 101c is not inserted, the zoom mode is set. An instruction of the zoom switch 115 is received, the drive prohibition of the aperture is released, the close distance limiter is released, and the conversion coordinate coefficient corresponding to the position of the variator lens 101b is received from the data table 106. If the corresponding data does not exist, it is obtained by interpolation from a plurality of data tables before and after the position to perform the video signal processing of distortion aberration correction.

Next, the variable magnification lens of the present invention is described.

In the variable magnification lens of the present invention, in order from the object side, the first lens group having positive refractive power, the second lens group having negative refractive power that shifts on the optical axis to perform a variable magnification action, the third lens group having positive refractive power, the fourth lens group having negative refractive power that in varying magnification from the wide angle end to the telephoto end, shifts to the image side on the optical axis once, and then shifts to the object side to correct fluctuation in image position caused with the variable magnification, and performs a focusing action, and the fifth lens group having positive refractive power are arrayed. T lens group that are arranged between the fourth lens group and the fifth lens group in an insertable and detachable manner is made up of the positive lens group and the negative lens group in order from the object side. In the first variable magnification form, the first lens group, the third lens group and the fifth lens group are fixed, the T lens group is withdrawn from the optical path to the position where it does not disturb the shift of the fourth lens group, and mainly by shifting the second lens group in the optical axis direction, the magnification is varied. By shifting the fourth lens group in the optical axis direction, the correction of fluctuation in image position and focusing are performed. In the second variable magnification form, the second lens group is fixed in the position of the telephoto end in the first variable magnification form, and the T lens group is inserted between the fourth lens group and the fifth lens group so that the optical axis thereof is shared with the other lens groups to make the focal distance longer than the focal distance at the telephoto end in the first variable magnification form, and the focusing is performed by the fourth lens group.

In the variable magnification lens of the present invention, in the first variable magnification form in which the T lens group is withdrawn from the optical path, the photographing using continuous variable magnification is enabled in the focal range from the wide angle end to the telephoto end (the focal distance which is several tens times of wide angle area). In the second variable magnification form in which the T lens group is inserted into the optical path, the photographing in the super telephoto area in which the focal distance is made longer than the focal distance at the telephoto end in the first variable magnification form is enabled. Moreover, the fourth lens group is located closer to the object at the telephoto end, and thus, although the insertion space for T lens group is kept between the fourth lens group and the fifth lens group in the telephoto end state, an entire lens length does not need to be increased.

In the variable magnification lens according to one embodiment of the present invention, the positive lens group constituting the T lens group is made of a cemented lens of a concave meniscus lens with a convex surface facing the object side, and a convex lens, and it is desirable to satisfy the following condition expressions (1), (2), (3), (4).

$$0.8<|DW45/f4|<1.2 \tag{1}$$

$$0.35<DT/DW45<0.6 \tag{2}$$

$$nT1>1.77 \tag{3}$$

$$nT2<1.62 \tag{4}$$

f4: a focal distance of the fourth lens group
DW45: a spacial distance between the fourth lens group and the fifth lens group at the wide angle end in the first variable magnification form
DT: a special distance inside of the T lens group
nT1: a refractive index of the concave meniscus lens of the T lens group
nT2: a refractive index of the convex lens of the T lens group.

These allow the T lens group to be inserted into the optical path without increasing the entire lens length, and further can prevent an issue that a Petzval summation is increased on the minus side, making it difficult to correct image surface curvature when T lens group is inserted to optical path.

The condition expression (1) relates to assurance of the spacial distance allowing the insertion of the T lens group, and an exit pupil distance. If a value is below a lower limit value, the T lens group cannot be inserted unless a lens configuration length of the T lens group is reduced, while if the lens configuration length of the T lens group is reduced, a variable magnification ratio cannot be made larger when the mode is switched to the super-telephoto single focal mode (second variable magnification mode). If a value exceeds an upper limit value, since a distance from the aperture to the fifth lens group becomes long, the exit pupil distance at the wide angle end becomes short at the plus side, and a main light beam enters peripheral pixels of the imaging element obliquely, thereby facilitating shortage in a peripheral light amount.

The condition expression (2) relates to the variable magnification ratio when the mode is switched to the super-telephoto signal focal mode, and a close distance in the super-telephoto single focal mode. If a value is below a lower limit value, a ratio of refractive powers of the positive lens group on the object side and the negative lens group on the image side forming the T lens group becomes large, and an absolute value of the Petzval sum on the minus side becomes too large, whereby correction of the image surface curvature falling on the plus side is made difficult. If a value exceeds an upper limit value, the shift space of the fourth lens group for focusing becomes small, whereby the close distance becomes far and impractical.

The condition expressions (3) and (4) relate to the condition expression (2) and the correction of the Petzval sum. For substantially doubling the focal distance at the telephoto end in the zoom mode by the insertion of the T lens group without changing the entire lens length, the increase of Petzval sum on the minus side is not avoidable. In order to alleviate this, it is effective that the positive lens of the T lens group on the object side is formed by joining two lenses, in which a refractive index of the concave lens is set to be high, and a refractive index of the convex lens is set to be low.

In the variable magnification lens according to one embodiment of the present invention, it is desirable that at least one surface of a concave lens of the second lens group which is closest to the object is aspherical.

Barrel-shaped distortion aberration occurs at the wide angle end by the first variable magnification means and by the third variable magnification means, which is mainly attributed to the configuration of the first lens group. However, if a lens configuration of the first lens group is arranged such that the occurrence of the distortion aberration is reduced, the effect of reducing a front lens diameter according to Patent Document 2 fades, and thus, correction of the barrel-shaped distortion aberration is rational in the second lens group, whereby the effect of alleviating the deterioration of image quality when the distortion aberration is corrected in the video signal processing is obtained. Therefore, it is effective to employ the aspherical surface for the concave lens of the second lens group which is closest to the object side to correct the barrel-shaped distortion aberration.

Figure 5:
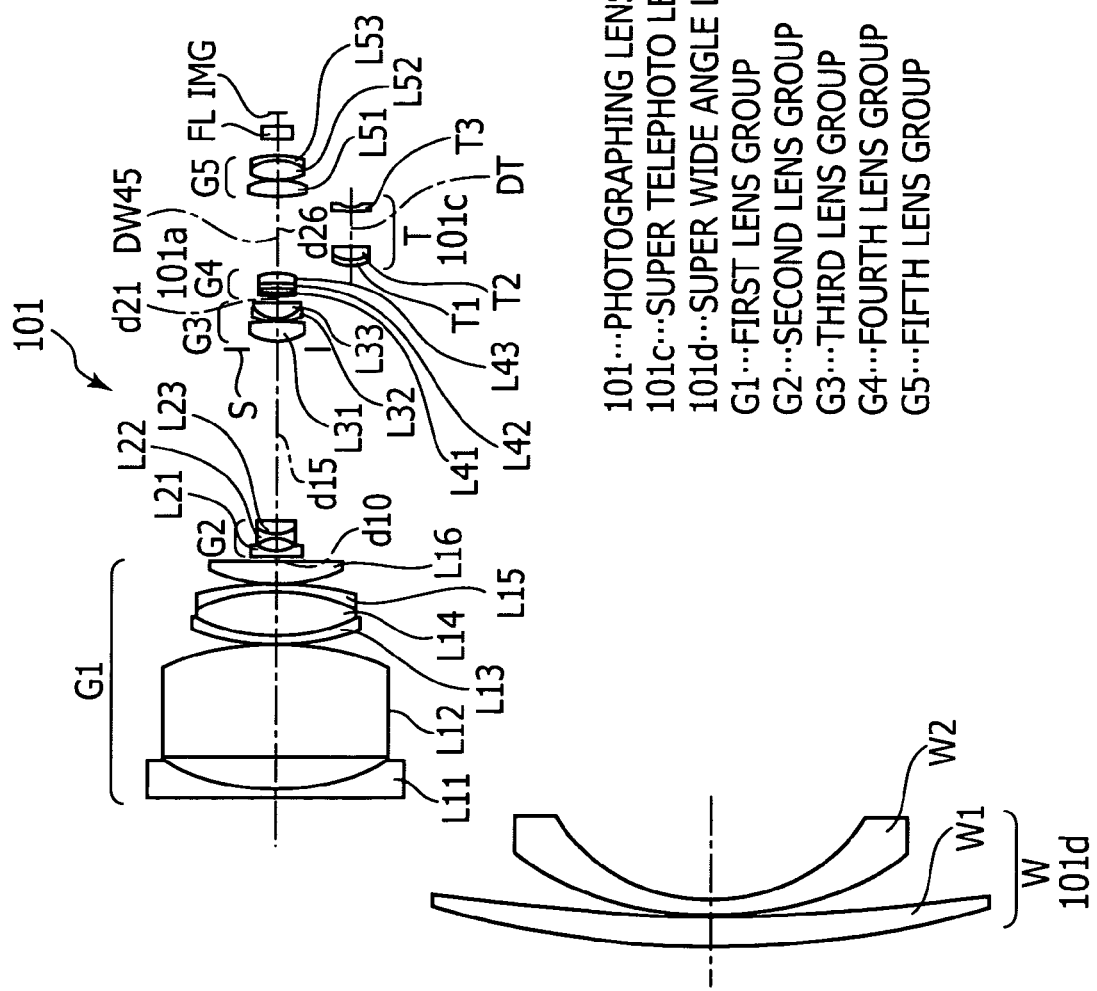
FIG. 5 is a view showing a lens configuration of one embodiment of the variable magnification lens.

Next, referring to FIG. 5, a specific embodiment of the variable magnification lens of the present invention is described.

In the zoom mode (first variable magnification form) of the variable magnification lens 101, that is, in the lens configuration in which neither the T lens group nor the W lens group are inserted to the optical path, in order from the object side, the first lens group G1 having positive refractive power, the second lens group G2 having negative refractive power, the third lens group G3 having the positive refractive power, the fourth lens group G4 having negative refractive power, and the fifth lens group G5 having positive refractive power are arrayed. The first lens group G1, the third lens group G3, and the fifth lens group G5 are fixed, and mainly by shifting the second lens group G2 in the optical axis direction, the magnification is varied, and by shifting the fourth lens group G4 in the optical axis direction, the correction of fluctuation in image position and focusing are performed. A surface on the image side (12th surface) of a concave lens L21 of the second lens group G2 which is closest to the object is aspherical.

The first lens group G1 is formed of a concave lens L11, a convex lens L12 with a strong convex surface facing the image side, a three cemented lenses of a concave meniscus lens L13 with a concave surface facing the image side, a biconvex lens L14 and a concave meniscus lens L15 with a concave surface facing the object side, and a convex lens L16, which are located in order from the object side. The second lens group G2 is formed of the concave lens L21 with a strong concave surface facing the image side, and a cemented lens of a biconcave lens L22 and a convex lens L23, which are located in order from the object side, and the surface of the concave lens L21 on the image side (12th surface) is aspherical. The third lens group G3 is formed of a biconvex lens L31, and a cemented lens of a concave meniscus lens L32 with a concave surface facing the image side and a convex lens L33, which are located in order from the object side, and a surface of the biconvex lens L31 on the image side (18th surface) is aspherical. The fourth lens group G4 is formed of a concave lens L41 with a strong concave surface facing the image side, and a cemented lens of a biconcave lens L42 and a convex lens L43, which are located in order from the object side. The fifth lens group G5 is formed of a biconvex lens L51, and a cemented lens of a biconvex lens L52 and a concave meniscus lens L53 with a concave surface facing the object side, which are located in order from the object side, and a surface of the biconvex lens L52 on the object side (29th surface) is aspherical. A parallel plane glass FL such as an infrared ray cut filter is provided between the fifth lens group G5 and an image surface IMG. Moreover, an aperture S is arranged adjacent to the object side of the third lens group G3, and is fixed during varying the magnification.

Next, lens data in the zoom mode (first variable magnification form) in Numerical Example 1 in which specific numerical values are applied to the variable magnification lens 101 is shown in Table 1. In the following description, a surface number i denotes a serial surface number in the respective modes (variable magnification forms), a curvature radius r denotes a paraxial curvature radius of each surface, a surface distance d denotes an axial surface distance between an i-th surface and an (i+1)-th surface, a refractive index nd denotes a refractive index on a d-line ($\lambda$(wavelength)=587.6 nm (nanometers)) of a material of each optical element, and an Abbe number vd denotes an Abbe number on the d-line of the material of each optical element. Sign ∞ with respect to the curvature radius r denotes that the surface is a flat surface.

TABLE 1

| Optical element | Surface number i | Curvature radius r | Surface distance d | Refractive index nd | Abbe number vd |
|---|---|---|---|---|---|
| L11 | 1 | 614.560 | 1.500 | 1.83481 | 42.7 |
|  | 2 | 35.264 | 4.74 | 1. |  |
| L12 | 3 | ∞ | 16.5 | 1.48749 | 70.4 |
|  | 4 | −39.455 | 0.2 | 1. |  |
| L13 | 5 | 40.985 | 1.000 | 1.80420 | 46.5 |
| L14 | 6 | 26.351 | 6.551 | 1.45650 | 90.2 |
| L15 | 7 | −26.351 | 1.000 | 1.80420 | 46.5 |
|  | 8 | −46.392 | 0.2 | 1. |  |
| L16 | 9 | 23.104 | 3.293 | 1.49700 | 81.6 |
|  | 10 | −214.265 | Variable | 1. |  |
| L21 | 11 | 125.000 | 0.65 | 1.85135 | 40.1 |
|  | 12 | 5.919 | 1.808 | 1. |  |
| L22 | 13 | −7.309 | 0.45 | 1.80420 | 46.5 |
| L23 | 14 | 7.309 | 1.944 | 1.94595 | 18.0 |
|  | 15 | −316.580 | Variable | 1. |  |

TABLE 1-continued

| Optical element | Surface number i | Curvature radius r | Surface distance d | Refractive index nd | Abbe number vd |
|---|---|---|---|---|---|
| Aperture | 16 | ∞ | 1.450 | 1. | |
| L31 | 17 | 10.281 | 2.569 | 1.58313 | 59.4 |
| | 18 | −24.016 | 0.2 | 1. | |
| L32 | 19 | 11.669 | 0.45 | 1.84666 | 23.8 |
| L33 | 20 | 5.632 | 2.119 | 1.51742 | 52.2 |
| | 21 | −62.154 | Variable | 1. | |
| L41 | 22 | 98.337 | 0.45 | 1.77250 | 49.6 |
| | 23 | 13.158 | 0.945 | 1. | |
| L42 | 24 | −15.330 | 0.45 | 1.83400 | 37.3 |
| L43 | 25 | 10.654 | 1.517 | 1.92286 | 20.9 |
| | 26 | −306.816 | Variable | 1. | |
| L51 | 27 | 14.019 | 2.259 | 1.53172 | 48.9 |
| | 28 | −14.019 | 0.2 | 1. | |
| L52 | 29 | 10.890 | 2.862 | 1.58313 | 59.4 |
| L53 | 30 | −7.343 | 0.45 | 1.92286 | 20.9 |
| | 31 | −45.712 | 2.789 | 1. | |
| F | 32 | ∞ | 1.690 | 1.51680 | 64.2 |
| | 33 | ∞ | 2.000 | 1. | |
| Image surface | 34 | ∞ | | | |

As described above, the 12th surface, the 18th surface and the 29th surface are each aspherical. Fourth-order, sixth-order, eighth-order, and tenth-order aspherical coefficients A4, A6, A8, and A10 of the respective surfaces are shown together with a conical constant κ in Table 2. In Table 2, "e-i" represents an exponential notation with 10 as a base, that is, "$10^{-i}$", and for example, "0.12345e-05" represents "$0.12345 \times 10^{-5}$".

In the present specification, if "xi" is a depth of an aspherical surface, "H" is a height from the optical axis, "κ" is a conical constant, "ri" is a curvature radius, and "Ak" is a k-th-order aspherical coefficient, an aspherical shape is defined by the following expression 1.

$$xi = \frac{H^2}{ri(1 + \sqrt{1 - (\kappa+1)H^2/ri^2})} + \sum AkH^k$$

TABLE 2

| | Aspherical coefficient | | | | |
|---|---|---|---|---|---|
| Surface number | κ | A4 | A6 | A8 | A10 |
| 12 | 1.1457 | −0.77396e−03 | −0.38591e−04 | −0.17032e−07 | −0.13777e−06 |
| 18 | 0 | +0.20939e−03 | −0.12658e−06 | −0.65676e−08 | |
| 29 | 0 | −0.37164e−04 | +0.31138e−05 | +0.88246e−07 | |

During zooming from the wide angle end to the telephoto end, a distance d10 between the first lens group G1 and the second lens group G2, a distance d15 between the second lens group G2 and the third lens group G3 (aperture S), a distance 21 between the third lens group G3 and the fourth lens group G4, and a distance d26 between the fourth lens group G4 and the fifth lens group G5 vary. Respective values of the distances at the wide angle end (focal distance=1.632), an intermediate focal distance (focal distance=30.968), and the telephoto end (focal distance=60.454) are shown together with F-numbers, angles of view 2ω and exit pupil positions in Table 3.

TABLE 3

| Focal distance | 1.632 | 30.968 | 60.454 |
|---|---|---|---|
| F-number | 1.85 | 3.17 | 4.16 |
| 2ω (degree) | 82.20 | 5.02 | 2.52 |
| d10 | 0.790 | 21.712 | 25.108 |
| d15 | 25.768 | 4.845 | 1.450 |
| d21 | 0.900 | 10.267 | 1.120 |
| d26 | 11.416 | 2.049 | 11.196 |
| Exit pupil position (Image surface standard) | −11.580 | +81.309 | +11.772 |

The distance (DW45) between the fourth lens group and the firth lens group at the wide angle end is shown in Table 4.
[Table 4]
DW45=d26 of focal distance 1.632=11.416
Focal distances of the first to fifth lens groups are shown in table. 5.

TABLE 5

| Group | Starting surface | Focal distance |
|---|---|---|
| 1 | 1 | 24.717 |
| 2 | 10 | −4.107 |
| 3 | 15 | 10.056 |
| 4 | 22 | −10.500 |
| 5 | 27 | 9.555 |

Figure 6:
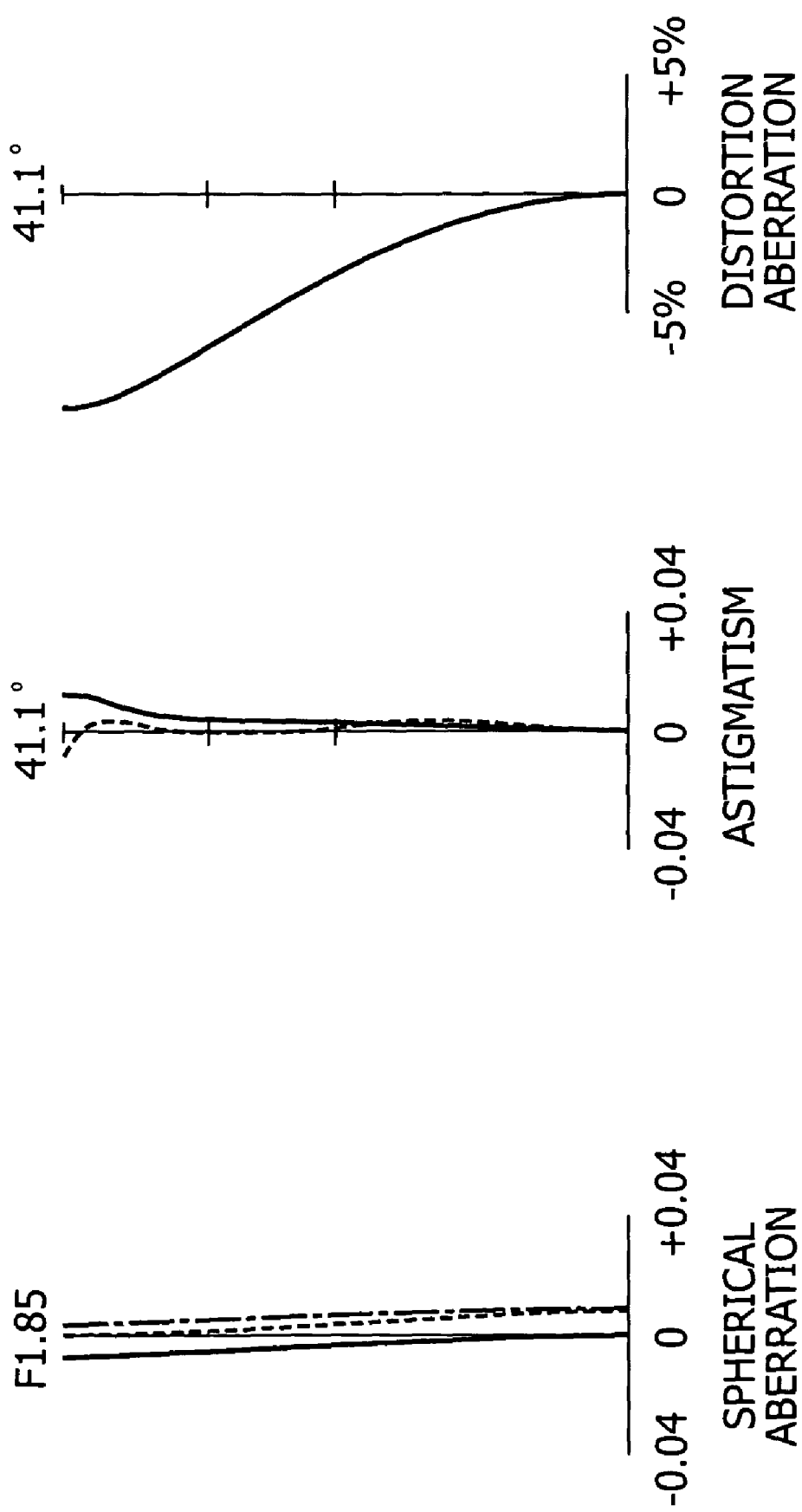
FIG. 6 is a diagram showing respective aberrations in the zoom mode (first variable magnification form), in which specific numerical values are applied to the variable magnification lens according to one embodiment together with FIGS. 7 and 8. The present view shows spherical aberration, astigmatism, and distortion aberration at a wide angle end.
Figure 7:
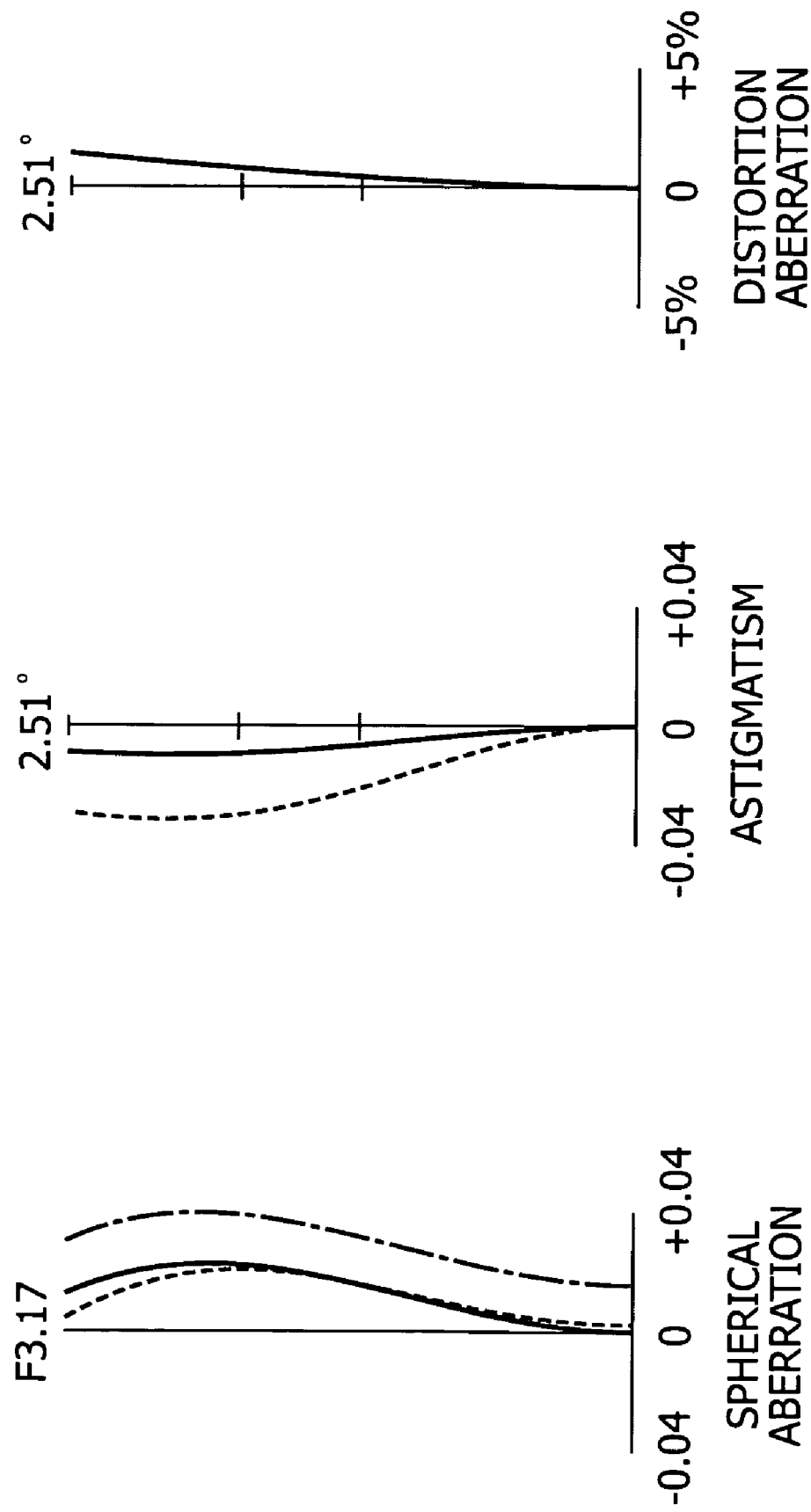
FIG. 7 is a diagram showing spherical aberration, astigmatism, and distortion aberration in an intermediate focal distance state.
Figure 8:
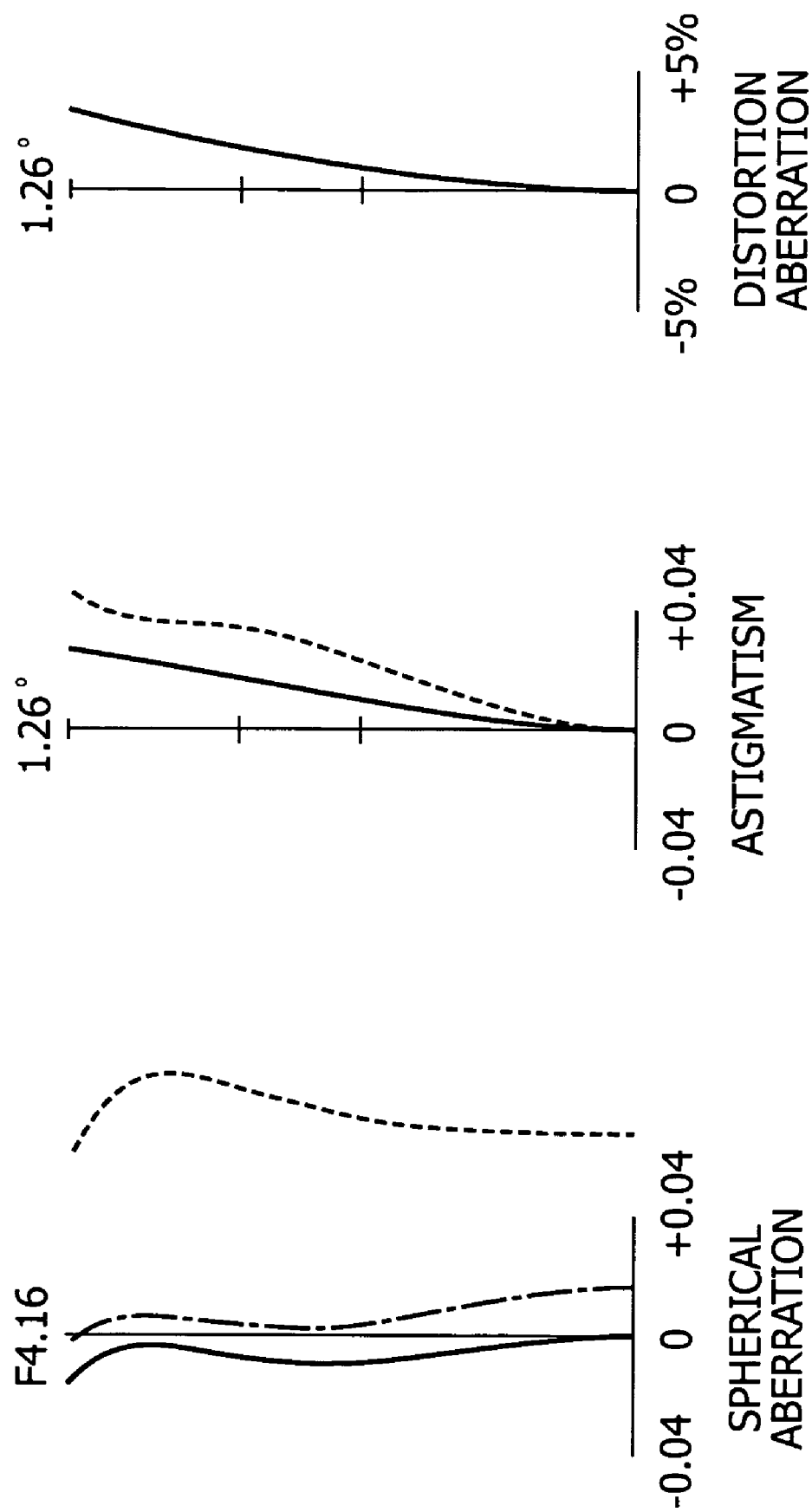
FIG. 8 is a diagram showing spherical aberration, astigmatism, and distortion aberration at a telephoto end.

Spherical aberration, image surface curvature, distortion aberration in the respective focal distances in Numerical Example 1 of the zoom mode are shown in FIG. 6 (at the wide angle end), FIG. 7 (at the intermediate focal distance), and FIG. 8 (at the telephoto end).

In the aberration diagrams, a solid line in a spherical aberration curve, and a lateral aberration curve denotes a d-line, a dashed line denotes a g-line (λ=435.8 nm), and an alternate long and short dashed line denotes a C-line (λ=656.3 nm), and a solid line in an astigmatism curve denotes a sagittal image surface, and a dashed line denotes a meridional image surface.

Next, the super-telephoto single focal mode as the second variable magnification form is described. The second lens group G2 is fixed in the position of the telephoto end in the zoom mode, the T lens group T is inserted between the fourth lens group G4 and the fifth group G5 so that an optical axis thereof is shared with other lens groups G1, G2, G3, G4, and G5 to elongate the focal distance longer than the focal distance at the telephoto end in the zoom mode, and perform focusing by the four lens group G4.

Arrangement of the T lens group T for extending the focal distance on the image side of the focus lens group (fourth lens group G4) is intended to keep the shift amount of the focusing equivalent to that in the zoom mode. If the T lens group T for extending the focal distance were arranged nearer to the object side than the focus lens group, the light would enter the focus lens group in a state where a change rate of an object distance is squared to be expanded by the T lens group T for extending the focal distance. That is, if the variable magnification ratio of the T lens group T for extending the focal distance is about twice, about a fourfold shift amount is required for following a distance change of the focus lens group, which brings about adverse effects that the close distance becomes impractically far, and that it becomes difficult to correct the aberration fluctuation due to object distance change. That is, it is extremely rational variable magnification means to employ the zoom lens configuration of the positive, negative, positive, negative and positive refractive powers, and insert the T lens group T for extending the focal distance on the image side of the focus lens G4.

The positive lens group constituting the T lens group T includes a cemented lens of a concave meniscus lens T1 with a convex-surface facing the object side and a convex lens T2, and the negative lens group includes the biconcave lens T3. This T lens group T satisfies the above-described condition expressions (1), (2), (3) and (4).

Based on Numerical Example 1, lens data of Numerical Example 2 when the mode is switched to the super-telephoto single focal mode (second variable magnification form) is shown in Table 6.

TABLE 6

| Optical element | Surface number i | Curvature radius r | Surface distance d | Refractive index nd | Abbe number vd |
|---|---|---|---|---|---|
| L11 | 1 | 614.560 | 1.500 | 1.83481 | 42.7 |
|  | 2 | 35.264 | 4.74 | 1. |  |
| L12 | 3 | ∞ | 16.5 | 1.48749 | 70.4 |
|  | 4 | −39.455 | 0.2 | 1. |  |
| L13 | 5 | 40.985 | 1.000 | 1.80420 | 46.5 |
| L14 | 6 | 26.351 | 6.551 | 1.45650 | 90.2 |
| L15 | 7 | −26.351 | 1.000 | 1.80420 | 46.5 |
|  | 8 | −46.392 | 0.2 | 1. |  |
| L16 | 9 | 23.104 | 3.293 | 1.49700 | 81.6 |
|  | 10 | −214.265 | 25.108 | 1. |  |
| L21 | 11 | 125.000 | 0.65 | 1.85135 | 40.1 |
|  | 12 | 5.919 | 1.808 | 1. |  |
| L22 | 13 | −7.309 | 0.45 | 1.80420 | 46.5 |
| L23 | 14 | 7.309 | 1.944 | 1.94595 | 18.0 |
|  | 15 | −316.580 | 1.450 | 1. |  |
| Aperture | 16 | ∞ | 1.450 | 1. |  |
| L31 | 17 | 10.281 | 2.569 | 1.58313 | 59.4 |
|  | 18 | −24.016 | 0.2 | 1. |  |
| L32 | 19 | 11.669 | 0.45 | 1.84666 | 23.8 |
| L33 | 20 | 5.632 | 2.119 | 1.51742 | 52.2 |
|  | 21 | −62.154 | Variable | 1. |  |
| L41 | 22 | 98.337 | 0.45 | 1.77250 | 49.6 |
|  | 23 | 13.158 | 0.945 | 1. |  |
| L42 | 24 | −15.330 | 0.45 | 1.83400 | 37.3 |
| L43 | 25 | 10.654 | 1.517 | 1.92286 | 20.9 |
|  | 26 | −306.816 | Variable | 1. |  |
| T1 | 27 | 7.108 | 0.5 | 1.83481 | 42.7 |
| T2 | 28 | 5.080 | 2.104 | 1.51742 | 52.2 |
|  | 29 | −39.982 | 5.397 | 1. |  |
| T3 | 30 | −21.715 | 0.5 | 1.80420 | 46.5 |
|  | 31 | 7.346 | 1.500 | 1. |  |
| L51 | 32 | 14.019 | 2.259 | 1.53172 | 48.9 |
|  | 33 | −14.019 | 0.2 | 1. |  |
| L52 | 34 | 10.890 | 2.862 | 1.58313 | 59.4 |
| L53 | 35 | −7.343 | 0.45 | 1.92286 | 20.9 |
|  | 36 | −45.712 | 2.789 | 1. |  |
| F | 37 | ∞ | 1.690 | 1.51680 | 64.2 |
|  | 38 | ∞ | 2.000 | 1. |  |
| Image surface | 39 | ∞ |  |  |  |

For focusing, the fourth lens group G4 shifts in the optical axis direction. In other word, the surface distances d21 (surface distance between the third lens group) and d26 (surface distance between the T lens group) vary. Values of the respective surface distances when the object distance is infinite, and when it is −7440.0 (the first surface standard) are shown together with focal distances, F-numbers, and angles of view 2ω in Table 7.

TABLE 7

| Object distance | ∞ | −7440.0 (first surface standard) |
|---|---|---|
| Focal distance | 117.402 |  |
| F-number | 8.08 |  |
| 2ω (degree) | 1.33 |  |
| d21 | 0.901 | 1.391 |
| d26 | 1.415 | 0.925 |

Values of "|DW45/f4|" and "DT/DW45" are shown in Table 8.

TABLE 8

|DW45/f4| = 1.087
DT/DW45 = 0.473

Figure 9:
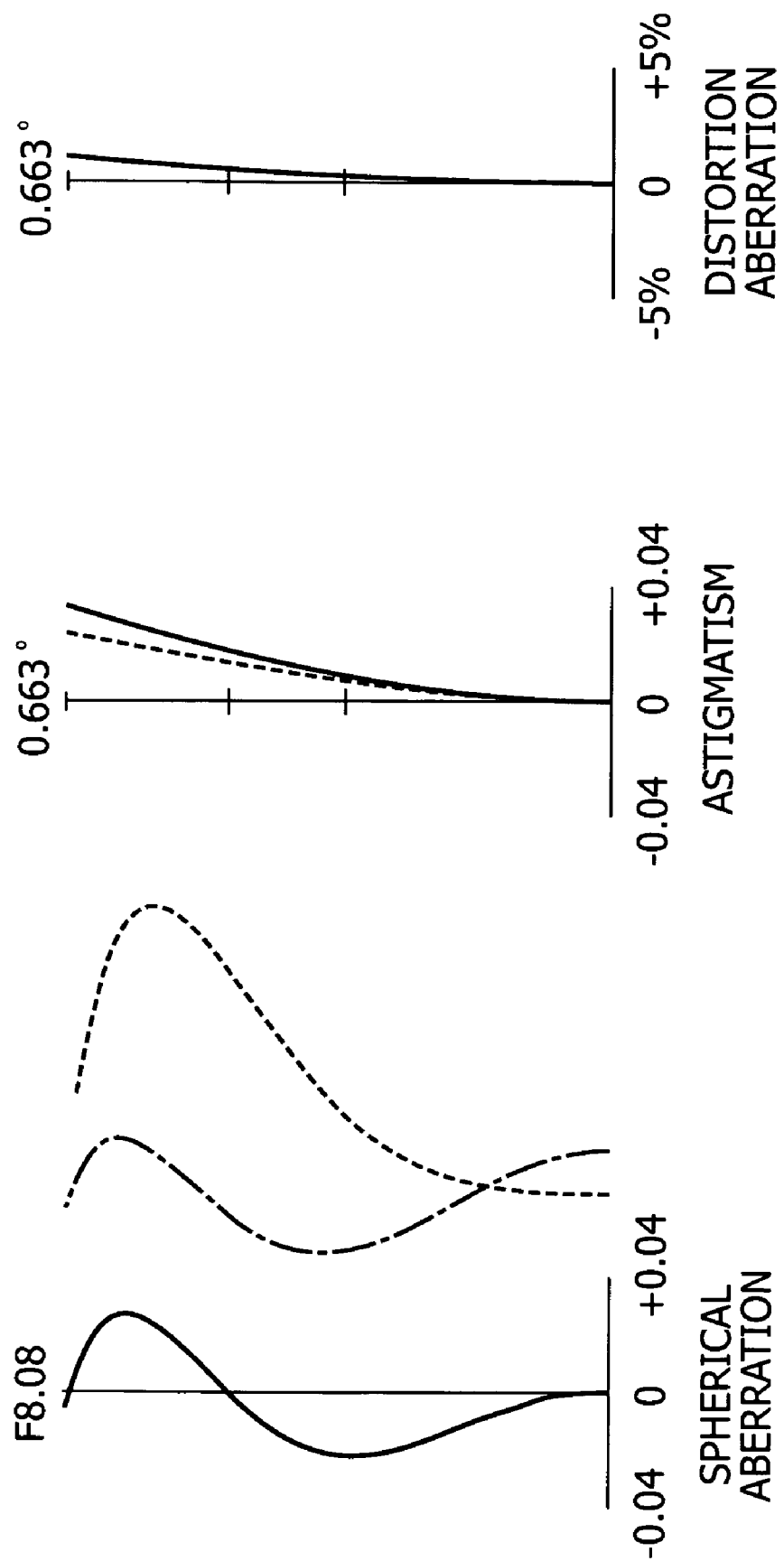
FIG. 9 is a diagram showing spherical aberration, astigmatism, and distortion aberration in a super-telephoto single focal mode (second variable magnification form), in which specific numerical values are applied to the variable magnification lens according to the one embodiment.

Spherical aberration, image surface curvature, distortion aberration in Numerical Example 2 of the super-telephoto single focal mode are shown in FIG. 9. In the aberration diagrams, a solid line in a spherical aberration curve, and a lateral aberration curve denotes a d-line, a dashed line denotes a g-line, and an alternate long and short dashed line denotes a C-line, and a solid line in an astigmatism curve denotes a sagittal image surface, and a dashed line denotes a meridional image surface.

Next, the super-wide-angle single focal mode as the third variable magnification form is described. The second lens group G2 is fixed in the position of the wide angle end in the zoom mode, and the W lens group W formed of the negative lens group is arranged on the object side of the first lens group G1 so that an optical axis thereof is shared with other lens groups G1, G2, G3, G4, and G5.

The W lens group W is formed of a positive meniscus lens W1 with a convex surface facing the object side, and a negative meniscus lens W2 with a strong concave surface facing the image side, which are located in order from the object side.

Based on Numerical Example 1, lens data of Numerical Example 3 when the mode is switched to the super-wide-angle single focal mode (third variable magnification form) is shown in Table 9.

TABLE 9

| Optical element | Surface number i | Curvature radius r | Surface distance d | Refractive index nd | Abbe number vd |
|---|---|---|---|---|---|
| W1 | 1 | 152.256 | 4.300 | 1.84666 | 23.8 |
|  | 2 | 286.697 | 0.3 | 1. |  |
| W2 | 3 | 52.470 | 2.000 | 1.83481 | 42.7 |
|  | 4 | 27.027 | 15 | 1. |  |
| L11 | 5 | 614.560 | 1.500 | 1.83481 | 42.7 |
|  | 6 | 35.264 | 4.74 | 1. |  |
| L12 | 7 | ∞ | 16.5 | 1.48749 | 70.4 |
|  | 8 | −39.455 | 0.2 | 1. |  |
| L13 | 9 | 40.985 | 1.000 | 1.80420 | 46.5 |
| L14 | 10 | 26.351 | 6.551 | 1.45650 | 90.2 |
| L15 | 11 | −26.351 | 1.000 | 1.80420 | 46.5 |
|  | 12 | −46.392 | 0.2 | 1. |  |
| L16 | 13 | 23.104 | 3.293 | 1.49700 | 81.6 |
|  | 14 | −214.265 | 0.790 | 1. |  |
| L21 | 15 | 125.000 | 0.65 | 1.85135 | 40.1 |
|  | 16 | 5.919 | 1.808 | 1. |  |
| L22 | 17 | −7.309 | 0.45 | 1.80420 | 46.5 |
| L23 | 18 | 7.309 | 1.944 | 1.94595 | 18.0 |
|  | 19 | −316.580 | 25.768 | 1. |  |

TABLE 9-continued

| Optical element | Surface number i | Curvature radius r | Surface distance d | Refractive index nd | Abbe number vd |
|---|---|---|---|---|---|
| Aperture | 20 | ∞ | 1.450 | 1. | |
| L31 | 21 | 10.281 | 2.569 | 1.58313 | 59.4 |
| | 22 | −24.016 | 0.2 | 1. | |
| L32 | 23 | 11.669 | 0.45 | 1.84666 | 23.8 |
| L33 | 24 | 5.632 | 2.119 | 1.51742 | 52.2 |
| | 25 | −62.154 | Variable | 1. | |
| L41 | 26 | 98.337 | 0.45 | 1.77250 | 49.6 |
| | 27 | 13.158 | 0.945 | 1. | |
| L42 | 28 | −15.330 | 0.45 | 1.83400 | 37.3 |
| L43 | 29 | 10.654 | 1.517 | 1.92286 | 20.9 |
| | 30 | −306.816 | Variable | 1. | |
| L51 | 31 | 14.019 | 2.259 | 1.53172 | 48.9 |
| | 32 | −14.019 | 0.2 | 1. | |
| L52 | 33 | 10.890 | 2.862 | 1.58313 | 59.4 |
| L53 | 34 | −7.343 | 0.45 | 1.92286 | 20.9 |
| | 35 | −45.712 | 2.789 | 1. | |
| F | 36 | ∞ | 1.690 | 1.51680 | 64.2 |
| | 37 | ∞ | 2.000 | 1. | |
| Image surface | 38 | ∞ | | | |

Values of a surface distance d25 between the third lens group G3 and the fourth lens group G4, and a surface distance d30 between the fourth lens group G4 and the fifth lens group G5 are shown together with focal distances, F-numbers, and angles of view 2ω in Table 10.

TABLE 10

| | |
|---|---|
| Focal distance | 1.180 |
| F-number | 1.85 |
| 2ω (degree) | 101.40 |
| d25 | 0.922 |
| D30 | 11.394 |

Spherical aberration, image surface curvature, distortion aberration in Numerical Example 3 of the super-wide-angle single focal mode are shown in FIG. 10. In the aberration diagrams, a solid line in a spherical aberration curve, and a lateral aberration curve denotes a d-line, a dashed line denotes a g-line, and an alternate long and short dashed line denotes a C-line, and a solid line in an astigmatism curve denotes a sagittal image surface, and a dashed line denotes a meridional image surface.

As described above, the present invention may be applied to a video camera, a still image video camera, a still camera and the like, and in the variable magnification lens, various aberrations except the distortion aberration are favorably corrected, and further, a variable magnification ratio exceeding 100 times as whole can be obtained. A frequently-used super-high-magnification zoom lens of about 40 times that is suitable for downsizing and covers from a super wide angle to a super telephoto is configured as a base, and as the entire image-capture apparatus, the focal distance at the telephoto end can be further extended, and the angle of view at the wide angle end can be further expanded with easy operation. For example, a super wide angle lens having an angle of view wider than 20 mm, and a super telephoto lens equivalent to 2000 mm can be easily used by converting into 35 mm format. A zoom lens capable of performing continuous variable magnification in the range of about 40 times equivalent to nearly 25 mm to 1000 mm is configured as a base, and a variable magnification ratio exceeding 100 times from nearly 17 mm to 2000 mm may be achieved. Moreover, in any angle of view, distortion aberration caused by the lens can be favorably corrected by the video signal processing.

The respective embodiments, numerical examples and the like are only examples of embodying the present invention, and the shapes, structures and numerical values described in the above do not limit the technical range of the present invention.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-208262 filed in the Japanese Patent Office on Aug. 7, 2007, the entire content of which being incorporated herein by reference.

What is claimed is:

1. An image-capture apparatus comprising:
a variable magnification lens;
imaging means for converting an image taken by the variable magnification lens into an electrical image signal; and
imaging control means, wherein;
by referring to a conversion coordinate coefficient prepared in accordance with a variable magnification rate in advance by the variable magnification lens, the image control means moves a point on the image defined by the image signal formed by the imaging means to form a new image signal subjected to the coordinate conversion, and outputs the new image signal;
in the variable magnification lens, in order from the object side, a first lens group having positive refractive power, a second lens group that has negative refractive power and performs a variable magnification action by shifting on an optical axis, a third lens group having positive refractive power, a fourth lens group that has negative refractive power, and in varying magnification from a wide angle end to a telephoto end, shifts to the image side once on the optical axis, and then shifts to the object side to correct fluctuation in image position caused by the variable magnification, and performs a focusing action, and a fifth lens group having positive refractive power are arrayed, and a T lens group formed of a positive lens group and a negative lens group located in order from the object side and is arranged between the fourth lens group and the fifth lens group in an insertable and detachable manner is included,
in a first variable magnification form, the first lens group, the third lens group and the fifth lens group are fixed, the T lens group is withdrawn from an optical path to a position where the group does not disturb the shift of the fourth lens group, and mainly by shifting the second lens group in an optical axis direction, the magnification is varied, and by shifting the fourth lens group in the optical axis direction, the correction of the fluctuation in image position and the focusing are performed; and
in a second variable magnification form, the second lens group is fixed to a position of the telephoto end in the first variable magnification form, the T lens group is inserted between the fourth lens group and the fifth lens group such that an optical axis of the T lens group is shared with other lens groups to make a focal distance longer than a focal distance at the telephoto end in the first variable magnification form, and the focusing is performed by the fourth lens group.

2. An image-capture apparatus comprising:
a variable magnification lens;
imaging means for converting an image taken by the variable magnification lens into an electrical image signal; and
imaging control means, wherein;
by referring to a conversion coordinate coefficient prepared in accordance with a variable magnification rate by the variable magnification lens in advance, the image control means moves a point on the image defined by the image signal formed by the imaging means to form a new image signal subjected to the coordinate conversion, and outputs the new image signal;
in the variable magnification lens, in order from the object side, a first lens group having positive refractive power, a second lens group that has negative refractive power and performs a variable magnification action by shifting on an optical axis, a third lens group having positive refractive power, a fourth lens group that has negative refractive power, and in varying magnification from a wide angle end to a telephoto end, shifts to the image side on the optical axis once, and then shifts to the object side to correct fluctuation in image position caused by the variable magnification, and performs a focusing action, and a fifth lens group having positive refractive power are arrayed, and a W lens group formed of a negative lens group and is arranged on the object side near than the first lens group in attachable and detachable manner, is included;
in a first variable magnification form, the W lens group is withdrawn from an optical path, the first lens group, the third lens group and the fifth lens group are fixed, and by shifting the second lens group in an optical axis direction, the magnification is varied mainly, and by shifting the fourth lens group in the optical axis direction, the correction of the fluctuation in image position and the focusing are performed; and
in a third variable magnification form, the second lens group is fixed in a position of the wide angle end in the first variable magnification form, the W lens group is attached such that an optical axis thereof is shared with the other lens groups to make a focal distance shorter than a focal distance at the wide angle end in the first variable magnification form, and the focusing is performed by the fourth lens group.

3. An image-capture apparatus comprising:
a variable magnification lens;
imaging means for converting an image taken by the variable magnification lens into an electrical image signal; and
image control means, wherein;
by referring to a conversion coordinate coefficient prepared in accordance with a variable magnification rate by the variable magnification lens in advance, the image control means moves a point on the image defined by the image signal formed by the imaging means to form a new image signal subjected to the coordinate conversion, and outputs the new image signal;
in the variable magnification lens, in order from the object side, a first lens group having positive refractive power, a second lens group that has negative refractive power and performs a variable magnification action by shifting on an optical axis, a third lens group having positive refractive power, a fourth lens group that has negative refractive power, and in varying magnification from a wide angle end to a telephoto end, shifts to the image side on the optical axis once, and then shifts to the object side to correct fluctuation in image position caused by the variable magnification, and performs a focusing action, and a fifth lens group having positive refractive power are arrayed, and a W lens group formed of a negative lens group and arranged on the object side nearer than the first lens group in attachable and detachable manner, and a T lens group formed of a positive lens group and a negative lens group in order from the object side and provided between the fourth lens group and the fifth lens group in an insertable and withdrawable manner are included;
in a first variable magnification form, the W lens group is detached from an optical path, the first lens group, the third lens group and the fifth lens group are fixed, the T lens group is withdrawn from the optical path to a position where it does not disturb the shift of the fourth lens group, and by shifting the second lens group in an optical axis direction, the magnification is varied mainly, and by shifting the fourth lens group in the optical axis direction, the correction of the fluctuation in image position and the focusing are performed;
in a second variable magnification form, while the W lens group is detached from the optical path, the second lens group is fixed in a position of the telephoto end in the first variable magnification form, the T lens group is inserted between the fourth lens group and the fifth lens group such that an optical axis thereof is shared with the other lens groups to make a focal distance longer than a focal distance at the telephoto end in the first variable magnification form, and the focusing is performed by the fourth lens group; and
in a third variable magnification form, the second lens group is fixed in a position of the wide angle end in the first variable magnification form, the T lens group is withdrawn from the optical path, and the W lens group is attached such that an optical axis thereof is shared with the other lens groups to make a focal distance shorter than a focal distance at the wide angle end in the first variable magnification form, and the focusing is performed by the fourth lens group.

4. The image-capture apparatus according to claim 3, wherein;
at power-up, whether the W lens group and the T lens group are on the optical path is detected, and based on a result of the detection, when the W lens group is on the optical path, the third variable magnification form is applied to withdraw the T lens group from the optical path, and when the W lens group is not on the optical path, but the T lens group is inserted on the optical path, the second variable magnification form is applied, and when neither the W lens group nor the T lens group is on the optical path, the first variable magnification form is applied.

5. The image-capture apparatus according to claim 1, wherein;
in super telephoto photographing in the second variable magnification form, an open aperture is kept without shielding a light beam flux directed to a screen center by an aperture blade.

6. The image-capture apparatus according to claim 3, wherein;
in super telephoto photographing in the second variable magnification form, an open aperture is kept without shielding a light beam flux directed to a screen center by an aperture blade.

7. A variable magnification lens comprising, in order from the object side:
- a first lens group having positive refractive power;
- a second lens group that has negative refractive power and performs a variable magnification action by shifting on an optical axis;
- a third lens group having positive refractive power;
- a fourth lens group that has negative refractive power, and in varying magnification from a wide angle end to a telephoto end, shifts to the image side on the optical axis once, and then shifts to the object side to correct fluctuation in image position caused by the variable magnification, and performs a focusing action;
- a fifth lens group having positive refractive power; and
- a T lens group arranged between the fourth lens group and the fifth lens group in an insertable and withdrawable manner, and formed of a positive lens group and a negative lens group in order from the object side, wherein;
- in a first variable magnification form, the first lens group, the third lens group and the fifth lens group are fixed, the T lens group is withdrawn from an optical path to a position where it does not disturb the shift of the fourth lens group, and by shifting the second lens group in an optical axis direction, the magnification is varied mainly, and by shifting the fourth lens group in the optical axis direction, the correction of the fluctuation in image position and the focusing are performed; and
- in a second variable magnification form, the second lens group is fixed in a position of the telephoto end in the first variable magnification form, the T lens group is inserted between the fourth lens group and the fifth lens group such that an optical axis thereof is shared with the other lens groups to make a focal distance longer than a focal distance at the telephoto end of the first variable magnification form, and the focusing is performed by the fourth lens group.

8. The variable magnification lens according to claim 7, wherein the positive lens group forming the T lens group includes a cemented lens of a concave meniscus lens with a convex surface facing the object side, and a convex lens, and satisfies the following condition expressions (1), (2), (3), and (4);

$$0.8 < |DW45/f4| < 1.2 \tag{1}$$

$$0.35 < DT/DW45 < 0.6 \tag{2}$$

$$nT1 > 1.77 \tag{3}$$

$$nT2 < 1.62 \tag{4}$$

f4: a focal distance of the fourth lens group
DW45: a spacial distance between the fourth lens group and the fifth lens group at the wide angle end in the first variable magnification form
DT: a spacial distance in the T lens group
nT1: a refractive index of the concave meniscus lens of the T lens group
nT2: a refractive index of the convex lens of the T lens group.

9. The variable magnification lens according to claim 7, wherein;
at least one surface of a concave lens of the second lens group closest to the object is aspherical.

* * * * *